US012556851B2

(12) United States Patent
Ikeda

(10) Patent No.: US 12,556,851 B2
(45) Date of Patent: Feb. 17, 2026

(54) CONFIGURATION SYSTEM AND METHOD FOR AIRCRAFT EQUIPMENT

(71) Applicant: Panasonic Intellectual Property Management Co., Ltd., Osaka (JP)

(72) Inventor: Kotaro Ikeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 265 days.

(21) Appl. No.: 18/203,145

(22) Filed: May 30, 2023

(65) Prior Publication Data

US 2024/0080601 A1 Mar. 7, 2024

Related U.S. Application Data

(60) Provisional application No. 63/347,026, filed on May 31, 2022.

(51) Int. Cl.
*H04R 1/10* (2006.01)
*H04R 1/22* (2006.01)

(52) U.S. Cl.
CPC ................. *H04R 1/10* (2013.01); *H04R 1/22* (2013.01); *H04R 2499/13* (2013.01)

(58) Field of Classification Search
CPC ... H04R 1/10; H04R 1/22; H04R 3/04; H04R 2499/13; H04R 27/00; H04R 2420/05; H04S 7/302; H04S 7/307; H04S 7/308; H04S 2400/13; H03G 5/165
See application file for complete search history.

(56) References Cited

U.S. PATENT DOCUMENTS

2007/0044126 A1 2/2007 Mitchell
2007/0078546 A1 * 4/2007 Hsieh ........................ H04R 3/04 700/94
(Continued)

FOREIGN PATENT DOCUMENTS

JP 2008-294516 12/2008
JP 2009-232205 10/2009
(Continued)

OTHER PUBLICATIONS

Extended European Search Report issued Nov. 23, 2023 in corresponding European Patent Application No. 23176480.4.
(Continued)

*Primary Examiner* — Jason R Kurr
(74) *Attorney, Agent, or Firm* — Wenderoth, Lind & Ponack, L.L.P.

(57) ABSTRACT

An equalizer setting information generating system for an aircraft entertainment system includes an earphone characteristic acquiring section for acquiring characteristics of an earphone, an audio reproduction device identifying section for identifying acoustic characteristics of an audio reproduction device to be used with the earphone, and an equalizer information generating section or generating equalizer setting information to be applied to the audio reproduction device, by using the information acquired by the earphone characteristic acquiring section and the information identified by the audio reproduction device identifying section, so as to generate information about equalizer setting.

14 Claims, 13 Drawing Sheets

(56) References Cited

U.S. PATENT DOCUMENTS

| | | | | |
|---|---|---|---|---|
| 2009/0147134 | A1* | 6/2009 | Iwamatsu | H04N 21/439 381/59 |
| 2014/0301567 | A1* | 10/2014 | Kim | H04R 3/04 381/94.1 |
| 2015/0156588 | A1* | 6/2015 | Kyriakakis | H04R 3/04 381/98 |
| 2016/0021158 | A1 | 1/2016 | Donaldson | |
| 2016/0373860 | A1 | 12/2016 | Leschika et al. | |
| 2017/0064452 | A1 | 3/2017 | Hartung | |
| 2021/0237660 | A1 | 8/2021 | Iwase et al. | |
| 2022/0174446 | A1 | 6/2022 | Watanabe | |
| 2023/0088236 | A1* | 3/2023 | Medin | H04N 21/431 725/76 |

FOREIGN PATENT DOCUMENTS

| | | |
|---|---|---|
| WO | 2020/195084 | 10/2020 |
| WO | 2021/168195 | 8/2021 |

OTHER PUBLICATIONS

Extended European Search Report issued Oct. 12, 2023 in corresponding European Patent Application No. 23176390.5.
Extended European Search Report issued Oct. 18, 2023 in corresponding European Patent Application No. 23176479.6.
Office Action issued May 28, 2025 in U.S. Appl. No. 18/203,142.

* cited by examiner

| SEAT CLASS / FLIGHT NUMBER | FIRST CLASS | BUSINESS CLASS | ECONOMY CLASS |
|---|---|---|---|
| A101 | IFE-1 | IFE-2 | IFE-3 |
| A102 | IFE-1 | IFE-2 | IFE-4 |
| A103 | IFE-2 | IFE-2 | IFE-3 |
| A104 | IFE-2 | IFE-5 | IFE-4 |
| A105 | IFE-1 | IFE-2 | IFE-3 |
| ⋮ | ⋮ | ⋮ | ⋮ |

FIG. 4

CONFIGURATION SYSTEM AND METHOD FOR AIRCRAFT EQUIPMENT

TECHNICAL FIELD

The present disclosure relates to a system for setting an audio reproduction device in an aircraft.

BACKGROUND ART

Patent Citation 1 discloses a reproduction device and a reproduction method in which a plurality of earphones can be used appropriately according to characteristics of each earphone. This device includes an acquisition means that acquires individual information of each connected earphone from the earphone, and a setting means for environmental setting of the device based on the individual information acquired by the acquisition means. In this way, data containing music can be reproduced with appropriate characteristics for the connected earphone.

PRIOR ART CITATIONS

Patent Citation

Patent Citation 1: JP-A-2008-294516

SUMMARY OF INVENTION

Technical Problem

The present disclosure provides an audio correction means that is suitable for use in an aircraft.

As for the above-mentioned means that uses individual information of the earphone, it is necessary that the earphone has the individual information for the device to identify the earphone. However, in reality, earphones distributed for use in an aircraft are required to be inexpensive, and hence it is difficult that the earphones have such individual information.

The present disclosure is made in view of the above-mentioned reason, and it is an object thereof to reproduce data containing music with appropriate characteristics for each earphone when using inexpensive earphones without individual information for identification.

Technical Solution

An equalizer setting information generating system for an aircraft entertainment system as a part of an audio tone correction system, according to one aspect of the present disclosure, includes an earphone characteristic acquiring section that acquires characteristics of an earphone, an audio reproduction device identifying section that identifies acoustic characteristics of an audio reproduction device that is used with the earphone, and an equalizer information generating section that generates equalizer setting information to be applied to the audio reproduction device, by using information acquired by the earphone characteristic acquiring section and information identified by the audio reproduction device identifying section.

Advantageous Effects

The audio tone correction system according to the present disclosure is effective for setting appropriate characteristics for each earphone that is used with an information terminal for aircraft and for each entertainment system.

BRIEF DESCRIPTION OF DRAWINGS

FIG. 4 is a diagram illustrating database content for identifying an audio reproduction device.

DESCRIPTION OF EMBODIMENTS

Embodiment 1

Hereinafter, with reference to FIGS. 1 to 8, Embodiment 1 is described. Audio tone correction systems according to Embodiments 1 to 3 are equalizer setting information generating systems for aircraft entertainment systems.

[1-1. Overall Structure of System]

In Embodiment 1, the audio tone correction system is constituted of an equalizer information generating system and an equalizer information application system. The audio tone correction system of this embodiment is equipped with a computer including at least one CPU. The equalizer information generating system and the equalizer information application system of this embodiment may have a common CPU or individual CPUs. The audio tone correction system of this embodiment is used for the purpose of improving sound quality of earphones provided by an airline company for use in an aircraft, for example. Note that the term "earphone" used in this disclosure of invention means a general device for transmitting sound to a human ear, and includes "headphones", "speakers", "bone-conduction devices", and the like.

Figure 1:
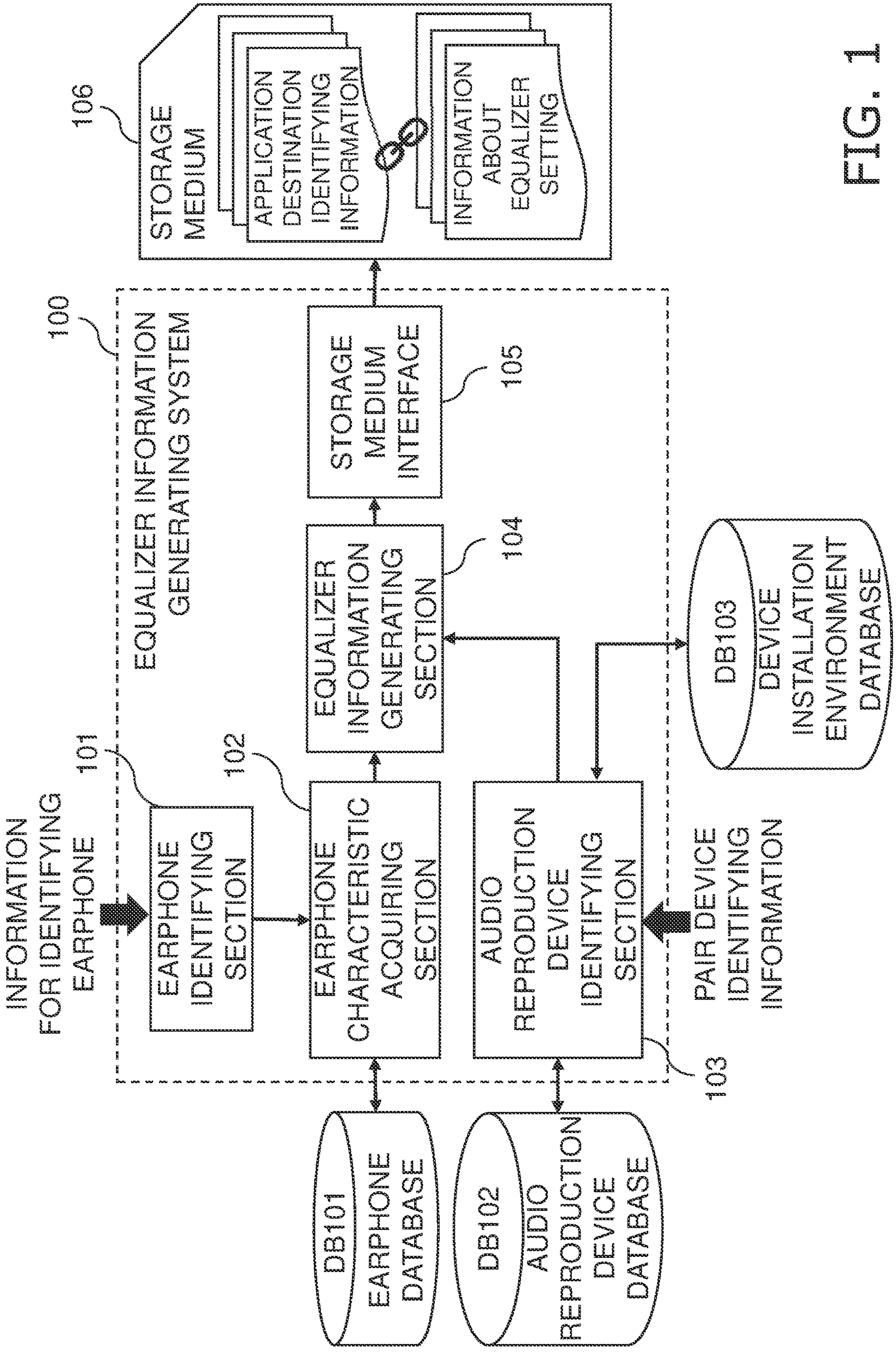
FIG. 1 is a structural diagram of an equalizer setting information generating system according to Embodiment 1.

FIG. 1 schematically illustrates a structure of an equalizer information generating system 100 according to Embodiment 1. The equalizer information generating system 100 is, for example, a system for generating information about equalizer setting for an earphone provided by an airline company for use in the aircraft.

Figure 5:
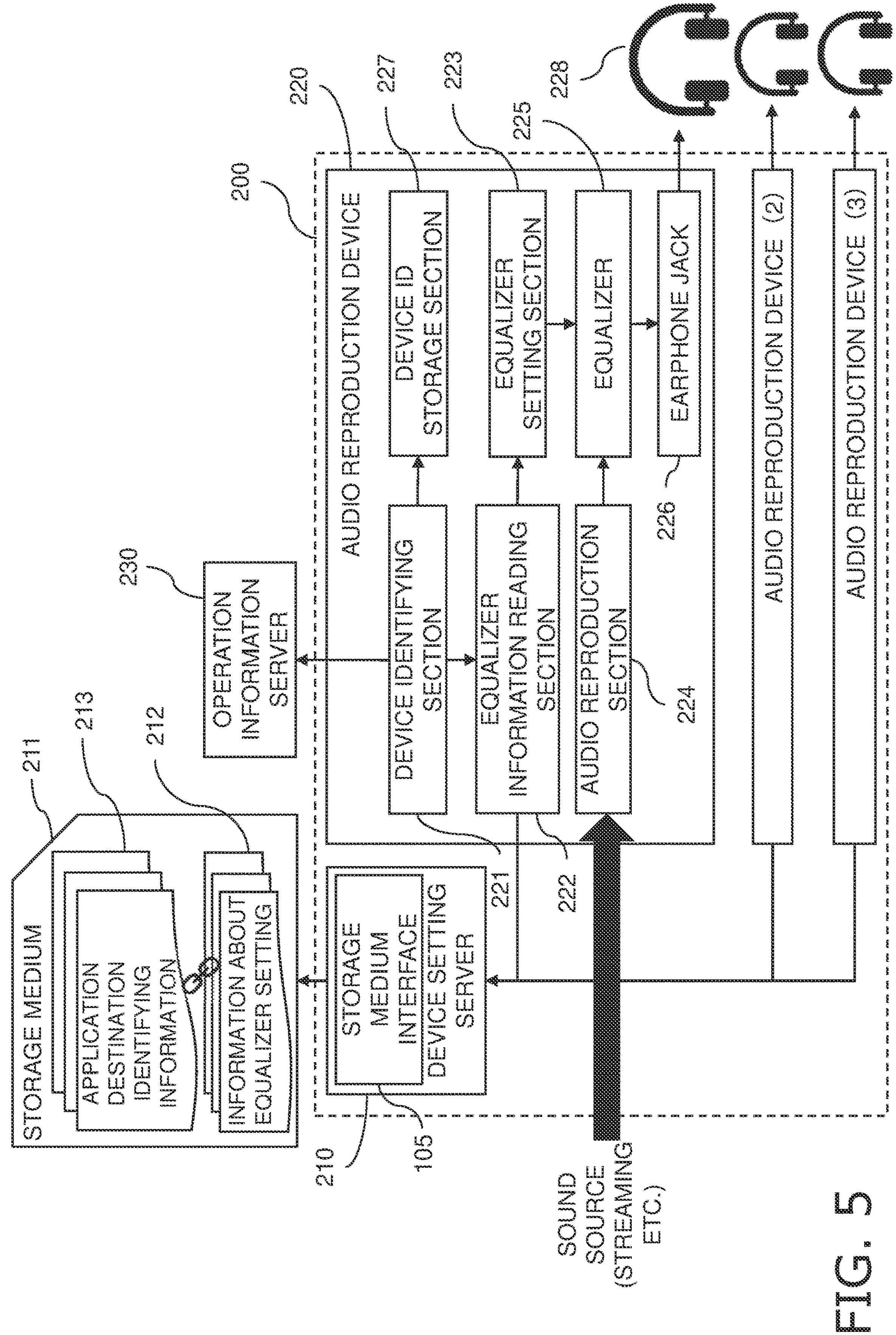
FIG. 5 is a structural diagram of an equalizer setting information application system according to Embodiment 1.

The equalizer information application system may be called an equalizer setting information setting system. FIG. 5 schematically illustrates a structure of an equalizer information application system 200 according to Embodiment 1. The equalizer information application system 200 is a system including a cabin entertainment system installed in the aircraft (an example of an audio reproduction device), and is a system for applying the equalizer setting generated by the equalizer information generating system 100 to the cabin entertainment system.

[1-2. Generation of Information about Equalizer Setting]

[1-2-1. Structure]

As illustrated in FIG. 1, the equalizer information generating system 100 includes an earphone identifying section 101, an earphone characteristic acquiring section 102, an audio reproduction device identifying section 103, an equalizer information generating section 104, and a storage medium interface 105.

The earphone identifying section 101 is software, hardware, or a combination thereof, which has a function of identifying model of the earphone that is used with the audio reproduction device based on acquired information, and storing the same. Specifically, it may be software such as spreadsheet software that works on a CPU of a computer.

The earphone identifying section 101 acquires information for identifying the earphone, from outside. Here, the information for identifying the earphone is, for example, a model number of the earphone. However, it can be any information as long as it is information that enables to identify the earphone to be used with the audio reproduction device and characteristics of the earphone. For instance, it may be a photograph of the earphone, or a product name of the earphone, or a symbol etc. uniquely attached to the earphone. In addition, if the earphone is supplied to the airline company as original design manufacturing (ODM), it may be information about the manufacturer as the supplier and the model number of the earphone. In the following description, it is supposed that the information for identifying the earphone is a model number of the earphone.

The earphone characteristic acquiring section 102 is software or hardware having a function of acquiring characteristics of the earphone for generating the information about equalizer setting. Here, the equalizer is hardware or software for a process of changing frequency characteristics of an output gain when reproducing sounds. Further, the information about equalizer setting is information for determining how to change frequency characteristics of sounds input to the equalizer. For instance, the information about equalizer setting may include one or more sets of combination of audio gain setting at a frequency and a frequency band width to which the gain is applied. Furthermore, "acquiring of characteristics of the earphone" in this embodiment means to know response characteristics of input frequencies and gains of the earphone. For instance, it may be an operation of reproducing a sound source for measuring characteristics with the earphone, recording and analyzing the reproduced sound, so as to measure the characteristics and to acquire the characteristics of the earphone. Note that, in order to acquire the characteristics more accurately, various frequencies of sound sources are reproduced (for example, a sweep wave is reproduced) with the earphone attached to an ear canal entrance of a dummy head, and sounds recorded with a microphone disposed in the ear of the dummy head are compared with the original sounds in amplitude and frequency distribution, and thus it is possible to acquire the characteristics of the earphone in consideration of transmission characteristics of the head. However, the measurement performed by the earphone characteristic acquiring section 102 may be any procedure as long as it can acquire the characteristics of the earphone necessary for generating the information about equalizer setting. For instance, if the input frequency and gain response characteristics of the earphone are disclosed by the earphone manufacturer, the information may be read.

In addition, the earphone characteristic acquiring section 102 may refer to information of an earphone database DB101 so as to acquire the characteristics of the earphone. The earphone database DB101 is a database that enables retrieving characteristics or other specifications of the earphone from the information for identifying the earphone. For instance, the earphone database DB101 may be a database including model numbers and pictures of earphones, and information about characteristics of the earphones, so that a picture of an earphone and information about characteristics of the earphone can be retrieved using the model number of the earphone as a key. Using the earphone database DB101, it is possible to simplify acquisition of characteristics of the earphone, in the case of generating the information about equalizer setting a plurality of times for the same earphone, or in the case of generating the information about equalizer setting for an earphone having high similarity with another earphone for which the information about equalizer setting was generated in the past. Note that the earphone database may be included in the equalizer information generating system or may be disposed outside of the equalizer information generating system.

The audio reproduction device identifying section 103 is software or hardware having a function of identifying characteristics of the audio reproduction device that is used with the earphone identified by the earphone identifying section 101. Specifically, it may be software that works on the CPU of the computer and makes access to the database. The audio reproduction device identifying section 103 first uses information for identifying the audio reproduction device that is used with the earphone (hereinafter, referred to as pair device identifying information), which is provided together with the information for identifying the earphone, so as to identify the audio reproduction device for which the characteristics are to be acquired, and further acquires characteristics of the identified audio reproduction device from the database or the like. Here, the pair device information is information sufficient for identifying the model of the audio reproduction device that is used with the earphone identified by the earphone identifying section 101, and may be, for example, information corresponding to a product name or a model number of the audio reproduction device, like "this earphone (model number E-100) is connected and used with the terminal of the model number T-100 of the entertainment system manufactured by Company A".

However, the pair device identifying information may be any information as long as it can identify the model of the audio reproduction device that is used with the earphone identified by the earphone identifying section 101. For instance, it may be information about installation environment of the audio reproduction device that is used with the earphone.

An example of the information about installation environment may be information about seat class in which the earphone is used. In an aircraft, different audio reproduction devices are disposed for different seat classes such as first class or economy class, and also different earphones are provided to the passengers in the different seat classes. If this system cooperates with a database that can identify the model of the audio reproduction device from the installation environment of the audio reproduction device (in this example, the database of the model of the audio reproduction device corresponding to the seat class, which is an example of a device installation environment database DB103 described later), it is possible to identify the model of the audio reproduction device by using the information about seat class in which the earphone is used as the pair device identifying information.

In addition, as another example, it may be possible to utilize that the model of the audio reproduction device installed at a seat can be identified from information about seat location to which the earphone is provided (for example, a seat number). For instance, it is like "this earphone is provided to the seat 60A, in which the terminal of the model number T-100 is installed". In other words, if this system cooperates with a database of the model of the audio reproduction device corresponding to the information about seat location (that is also an example of the device installation environment database DB103), the information about seat location can be the pair device identifying information.

In addition, it may be also possible to utilize that the model of the audio reproduction device installed at a seat can be identified from information about airline company that operates the flight route in which the earphone is provided. For instance, it is like "this earphone is provided in the flight route operated by ABC, and the terminal of the model number T-100 is installed in the airframe used by the airline company". In other words, if this system cooperates with a database of the model of the audio reproduction device corresponding to the airline company, the model of the audio reproduction device can be identified using information about the airline company as the pair device identifying information.

Similarly, it may be possible to use information about the model name of the aircraft, the manufacturer of the aircraft, or the flight number, as the pair device identifying information.

In addition, if the audio reproduction device is connected via an IP network in the aircraft, it may be possible to assign an IP addresses in a predetermined range to each seat class, or to assign a fixed IP to each installation place of the audio reproduction device. In this case, it may be possible to use information about the IP address assigned to the audio reproduction device to which the earphone is connected for use, as the pair device identifying information.

As a matter of course, the plurality of information as described above may be combined and used as the pair device identifying information.

In the following description, it is supposed that the pair device identifying information is a combination of the information about seat class and the information about flight number.

As the method for the audio reproduction device identifying section 103 to acquire the characteristics of the audio reproduction device from the identified model of the audio reproduction device, it may be possible, for example, to refer to information of an audio reproduction device database DB102. The audio reproduction device database DB102 is a database including a plurality of pairs of information about the identified audio reproduction device (for example, the model number of the audio reproduction device) and the characteristics of the audio reproduction device, so that the characteristics of the audio reproduction device can be retrieved using information about the audio reproduction device as a key. The audio reproduction device database DB102 may be included in the equalizer information generating system, or may be disposed outside of the equalizer information generating system. In addition, the audio reproduction device database DB102 may be a database that can retrieve the characteristics of the audio reproduction device using the pair device identifying information such as the seat class and flight number described above as a key. In that case, identification of the model of the audio reproduction device can be omitted, and the characteristics of the audio reproduction device can be directly acquired.

Note that the characteristics of the audio reproduction device mean information necessary for the audio reproduction device to reproduce sounds with intended acoustic output characteristics. For instance, the characteristics may be frequency and output gain response characteristics of input sound of the audio reproduction device. In addition, the characteristics of the audio reproduction device may be actually measured using the audio reproduction device, or may be determined by calculation or the like from the specification of the audio reproduction device. For instance, it may be determined from the specification of the audio reproduction device when it is designed, or may be determined from the specification of a component used in an audio reproduction section of the audio reproduction device.

Note that the "characteristics of the audio reproduction device" is general information necessary for the audio reproduction device to reproduce sounds with intended acoustic output characteristics, which are not limited to the frequency and output gain response characteristics of the input sound of the audio reproduction device. For instance, it may be possible to use information about the specification of the device such as a register or an application programming interface (API) of the device for the audio reproduction device to reproduce sounds with the intended acoustic characteristics.

In addition, the method for the audio reproduction device identifying section 103 to acquire the characteristics of the audio reproduction device from the identified model of the audio reproduction device is not limited to the method of acquiring the corresponding information from the audio reproduction device database DB102. It may be possible that the software requests a user to input data (for example, designation of a file or input of a numeric value) so that the corresponding information can be acquired, or it may be possible to actually measure and analyze acoustic characteristics of the audio reproduction device so that the characteristics can be acquired.

The equalizer information generating section 104 is software or hardware having a function of generating the information about equalizer setting. The equalizer information generating section 104 generates the information about equalizer setting from earphone characteristics acquired by the earphone characteristic acquiring section 102 and the characteristics of the audio reproduction device identified by the audio reproduction device identifying section 103.

Here, the information about equalizer setting is information given to the equalizer, in order to change gain characteristics of the equalizer so that frequency characteristics of sounds reproduced from the earphone become desired characteristics. Note that the desired characteristics may be total gain characteristics of the audio reproduction device and the earphone, which are designed by a designer with a certain intention. The characteristics may be characteristics having a constant gain value at all frequencies, or may be characteristics having a large or small gain value at specific frequencies.

By using both the characteristics of the earphone and the characteristics of the audio reproduction device to generate the information about equalizer setting in this way, even when using an inexpensive earphone having emphasized or attenuated sound pressure in a specific frequency band, audio reproduction characteristics faithful to the original sound can be realized, or it is possible to provide a listener with an acoustic experience of feeling high audio quality.

In addition, an element for adjusting frequency characteristics of the reproduced sounds according to the contents reproduced by the audio reproduction device may be added to the desired characteristics. For instance, when watching movies, powerful sound can be provided by emphasizing low frequencies, or speech can be easily heard by emphasizing human voice frequencies. In contrast, when listening to classical music, colorful sounds can be provided by emphasizing high frequencies.

The storage medium interface 105 is software or hardware having a function of storing the generated information about equalizer setting in a storage medium 106. The storage medium interface 105 may store the generated information about equalizer setting in association with the information for identifying the earphone or the information for identifying the audio reproduction device ("application destination identifying information" described later). In addition, the storage medium 106 in which the information is to be written may be a storage medium provided to the equalizer information application system 200 described later, or may be a storage medium that temporarily stores information so as to copy data to the storage medium provided to the equalizer information application system 200. In other words, the storage medium may be a hard disk drive, a solid state drive (SSD), or a removable disc such as an SD memory card (registered trademark). In the following description, it is supposed that the storage medium 106 is a storage medium that temporarily stores information.

The equalizer information generating system 100 may be realized by a single computer. The computer includes at least one CPU. The equalizer information generating system 100 may be realized by a single program, or may be realized by a plurality of programs. In any case, the program is executed by the CPU. The earphone identifying section 101, the earphone characteristic acquiring section 102, the audio reproduction device identifying section 103, and the equalizer information generating section 104 may be realized by one or more programs in one computer or one CPU. In other words, the earphone identifying section 101, the earphone characteristic acquiring section 102, the audio reproduction device identifying section 103, and the equalizer information generating section 104 may be regarded as functions realized by the computer and the program.

Note that the equalizer information generating system 100 may be realized by a plurality of programs and/or a plurality of hardware. In addition, a part of its operation may be performed manually. For instance, measurement of the characteristics of the earphone may be performed manually with a measuring device, or the retrieval using the earphone database DB101 or the audio reproduction device database DB102 may be performed manually and the retrieval result may be input manually to the equalizer information generating system 100.

[1-2-2. Operation]

Figure 2:
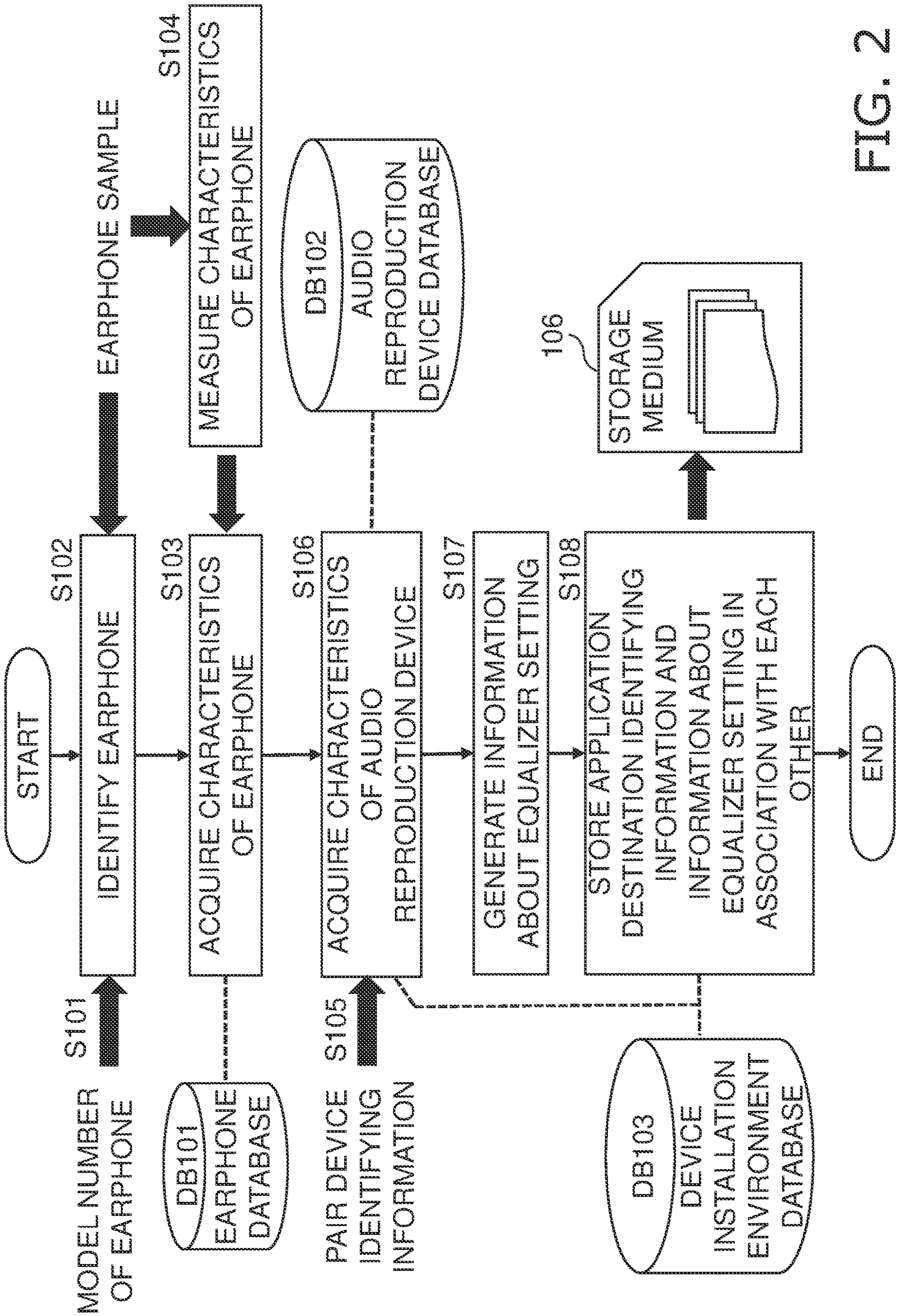
FIG. 2 is a flowchart illustrating an operation of the equalizer setting information generating system according to Embodiment 1.
Figure 3:
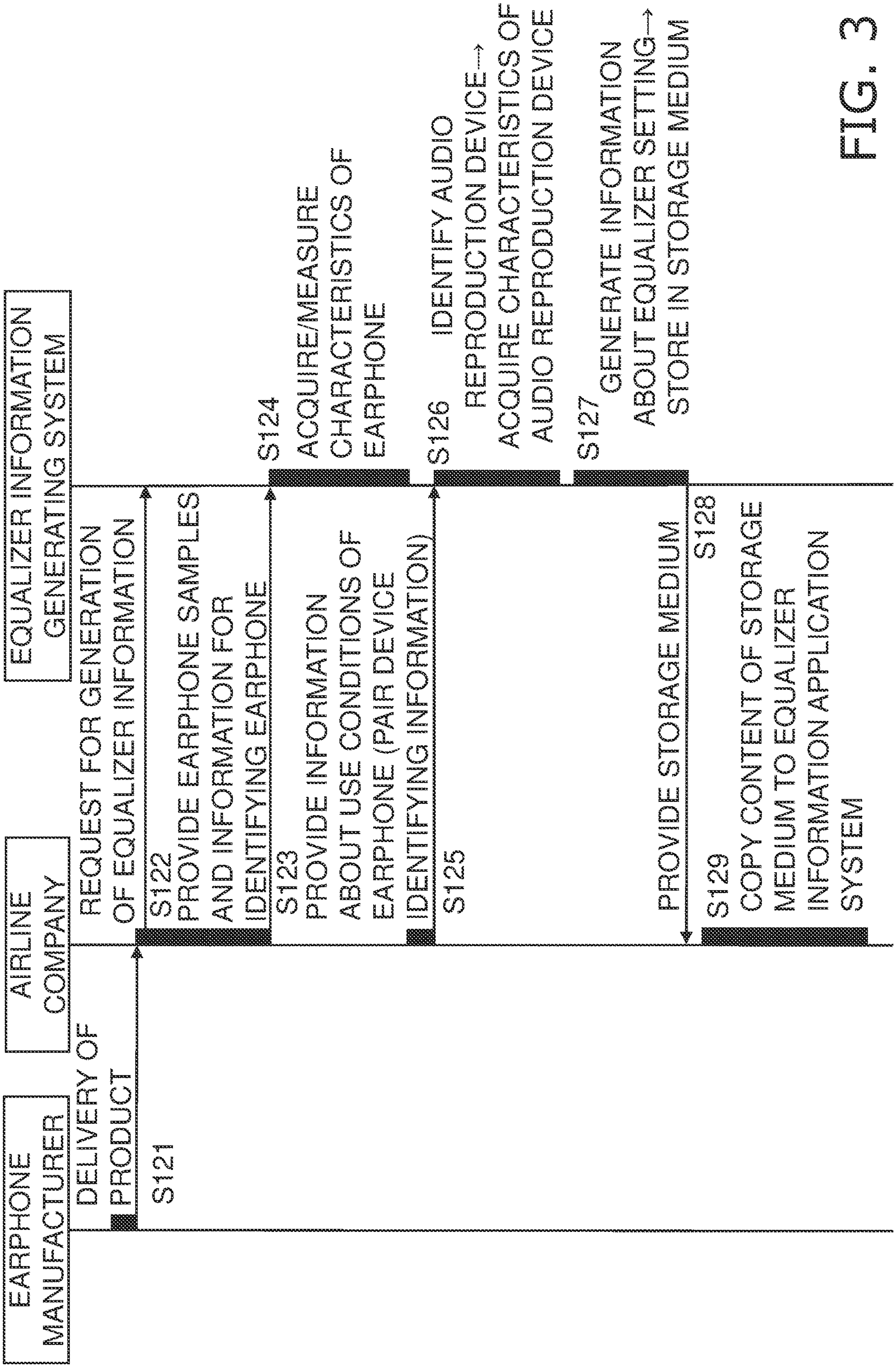
FIG. 3 is a sequence diagram illustrating cooperation between the equalizer setting information generating system according to Embodiment 1 and another system.

An example of a system operation is described with reference to the flowchart and the sequence diagram illustrated in FIGS. 2 and 3. FIG. 3 is a sequence diagram illustrating cooperation with another system when providing a service using the equalizer information generating system 100, and FIG. 2 is a flowchart illustrating an internal operation of the equalizer information generating system 100.

First, a flow of the service using the equalizer information generating system 100 in this embodiment is described with reference to FIG. 3.

At the beginning, the earphone manufacturer supplies the airline company with the earphones for passengers to use in the aircraft (S121).

The equalizer information generating system 100 receives request for generating the information about equalizer setting of the earphone and earphone samples from the airline company (S122).

The equalizer information generating system 100 receives the information for identifying the earphone and an earphone sample from the airline company. Here, the information for identifying the earphone is the model number or the name of the earphone, as described above. Note that if the earphone is easily available in the market or if the earphone is already registered in the earphone database DB101, and hence characteristics thereof are known, it is sufficient to receive only the model number or the name, but reception of the samples is not necessary (S123).

The equalizer information generating system 100 acquires the characteristics of the earphone identified by the information for identifying the earphone provided from the airline company. The method of acquiring the characteristics of the earphone was described above as an operation of the earphone characteristic acquiring section 102. Note that if the provided earphone is not registered in the earphone database DB101, after acquiring the characteristics of the earphone, the information for identifying the earphone and the characteristics of the earphone may be registered in the earphone database DB101 (S124).

The equalizer information generating system 100 receives the pair device identifying information from the airline company. As described above, the pair device identifying information is information for identifying the audio reproduction device that is used with the earphone provided in S123. For instance, the equalizer information generating system 100 receives from the airline company the information about the flight number and the seat class in which the earphones provided in S123 are provided to passengers (S125).

The equalizer information generating system 100 identifies the audio reproduction device that is used in pair with the provided earphone, on the basis of the pair device identifying information provided from the airline company. If the pair device identifying information is a parameter such as the model of the audio reproduction device, which directly specifies the audio reproduction device (if the "pair device identifying information" and the "information for identifying the audio reproduction device" have the same content), no process is required to be performed. If the pair device identifying information needs to be converted into the information for identifying the audio reproduction device, like information about the installation environment of the audio reproduction device, the conversion is performed using the device installation environment database DB103 illustrated in FIG. 4, for example. The device installation environment database DB103 is a database that stores a correspondence relationship between the installation environment of the audio reproduction device and the information for identifying the audio reproduction device. For instance, FIG. 4 illustrates a database storing combinations of the flight number, the seat class (an example of the installation environment of the audio reproduction device), and the model of the audio reproduction device installed at the seat ("IFE-1", "IFE-2" or the like, which is an example of the information for identifying the audio reproduction device). If the equalizer information generating system 100 is working in a business operator that supplies the airline company with the audio reproduction device, it is obvious that the equalizer information generating system 100 can easily access to the database. In the case of this example, if the pair device identifying information includes information of the flight number and the seat class, it is possible to identify the model of the audio reproduction device that is used in pair with the earphone, from the device installation environment database DB103. After identifying the audio reproduction device, the equalizer information generating system 100 acquires the characteristics of the identified audio reproduction device. The method of acquiring the characteristics of the audio reproduction device was described above as an operation of the audio reproduction device identifying section 103 (S126).

The equalizer information generating system 100 generates the information about equalizer setting by using the characteristics of the earphone identified in S124 and the characteristics of the audio reproduction device identified in S126. Furthermore, it stores the generated equalizer setting information with the application destination identifying information in the storage medium (S127).

Here, the application destination identifying information is information indicating the audio reproduction device to which the information about equalizer setting should be applied. As illustrated in FIG. 4, in one aircraft, different audio reproduction devices are usually installed in different seat classes. In this case, in the aircraft, it is necessary to prepare a plurality of the information about equalizer setting, and to use different information for the different audio reproduction devices. It is because the different audio reproduction devices have different characteristics. Therefore, each information about equalizer setting has to be stored in association with information of the audio reproduction device to which the information should be applied (the application destination identifying information). A specific example of the application destination identifying information and a specific example of the method for storing them in association with each other will be described later. The application destination identifying information is generated by the audio reproduction device identifying section 103 based on the pair device identifying information. If information having the same content as the pair device identifying information is used as the application destination identifying information, the audio reproduction device identifying section 103 is not required to perform conversion or processing of information.

The equalizer information generating system 100 provides the airline company with the storage medium that stores the information about equalizer setting and the application destination identifying information (S128).

The airline company copies the information stored in the storage medium to a storage medium connected to the equalizer information application system described later (S129).

Note that copying of the information to the storage medium connected to the equalizer information application system may be performed by the equalizer information generating system. In addition, the airline company may attach the provided storage medium as it is to the equalizer information system. In addition, the equalizer information generating system may directly write the information in the storage medium of the equalizer information application system via a network or the like.

An internal operation of the equalizer information generating system 100 from S124 to S127 is described in detail with reference to FIG. 2.

The information for identifying the earphone, which is provided from the airline company, is input to the earphone identifying section 101 (S101).

The earphone identifying section uses the input information for identifying the earphone so as to identify the earphone for which the information about equalizer setting is to be generated. As described above, a product name or a product model number of the earphone is used, for example, as the information for identifying the earphone (S102).

The earphone characteristic acquiring section 102 uses the earphone sample provided from the airline company so as to measure the characteristics of the earphone (S104).

In this embodiment, the characteristics of the earphone mean frequency and gain response characteristics of the earphone. In addition, "to measure characteristics of the earphone" means a procedure of reproducing a sound source for measuring characteristics with the earphone, and recording and analyzing the reproduced sound, so as to acquire the characteristics of the earphone. However, it may be any procedure in reality, as long as it enables to acquire the characteristics of the earphone necessary for generating the information about equalizer setting. For instance, if the characteristics of the earphone are known, the information may be acquired from the earphone database DB101.

The pair device identifying information, which is provided from the airline company, is input to the audio reproduction device identifying section 103 (S105).

The audio reproduction device identifying section 103 uses the input pair device identifying information so as to identify the audio reproduction device that is used with the earphone identified in S102. Furthermore, it acquires the characteristics of the identified audio reproduction device (S106).

In this embodiment, the flight number and the information about the seat class in which the earphone is used are used as the pair device identifying information. It is because when the flight number and the seat class are determined, the model of the audio reproduction device installed at the seat and performance thereof can be identified via the device installation environment database DB103. In addition, it is supposed that the characteristics of the audio reproduction device are acquired from the audio reproduction device database DB102 in this embodiment. However, in reality, the pair device identifying information and the method for acquiring the characteristics of the audio reproduction device also have lots of variations, as described above about the audio reproduction device identifying section 103.

The equalizer information generating section 104 generates the information about equalizer setting based on the characteristics of the earphone acquired in S103 and the characteristics of the audio reproduction device acquired in S106. For instance, the equalizer information generating section 104 generates the gain characteristics of the equalizer so that gain frequency characteristics output from the earphone become flat, in consideration of the frequency characteristics of the earphone and a relationship between the frequency characteristics of the audio reproduction device and earphone-reproduced audio frequency characteristics (S107).

Note that the information about equalizer setting may be generated automatically by the equalizer information generating system, or may be generated manually by an operator using a real device or a simulator.

In addition, the information about equalizer setting may not be equalizer gain setting itself, but may be information that the audio reproduction device uses for generating the equalizer gain setting. For instance, the whole or a part of the frequency characteristics of the earphone, and desired frequency characteristics of the audio output may be stored as the information about equalizer setting. In this case, an equalizer setting section 223 itself in the audio reproduction device, which will be described later, generates the equalizer gain setting from the frequency characteristics of the earphone and the desired frequency characteristics of the audio output, which are stored as the information about equalizer setting.

The storage medium interface 105 stores the information about equalizer setting in the storage medium 106. In this case, the storage medium interface 105 stores the application destination identifying information in association with the information about equalizer setting (S108).

As described above, the application destination identifying information is information indicating the audio reproduction device to which the information about equalizer setting should be applied. The information about equalizer setting is generated in consideration of the characteristics of the audio reproduction device. In addition, in an aircraft, different types of audio reproduction devices are usually installed according to flight number or seat class. Therefore, the storage medium 106 needs to store a plurality of information about equalizer setting, each of which needs to be clarified about the audio reproduction device to which it should be applied.

As a specific example of the application destination identifying information, there is the information for identifying the product name or the product model number of the audio reproduction device, or the information about installation environment of the audio reproduction device. If it has the same content as the pair device identifying information described above, processing of the system may be simplified, but it is not required to have the same content. It is because in the equalizer information application system 200 described later, information having the same content as the pair device identifying information cannot always be acquired from the audio reproduction device or the like. The application destination identifying information needs to consist of only the information that the equalizer information application system 200 can acquire.

The information about installation environment of the audio reproduction device that can be used as the application destination identifying information may be, for example, the information for identifying the flight number in which the audio reproduction devices are used, or the information for identifying the airline company that uses the audio reproduction device, or the information for identifying the model name of the aircraft in which the audio reproduction device is installed. In addition, other than that, it may be the information that identifies the manufacturer of the aircraft in which the audio reproduction device is installed, or the information about the seat class in which the audio reproduction device is installed, or the information for identifying the seat location in which the audio reproduction device is installed (for example the seat number), or the information for identifying the IP address given to the audio reproduction device. These information can be stored with high probability in an operation information server 230 described later or in a device ID storage section 227 of the audio reproduction device 220. As described above about the pair device characteristic information, it would be obvious that the type and performance of the audio reproduction device that is used at the seat can be uniquely identified with high probability, if the flight number, the airline company, or the model name or the manufacturer of the aircraft is identified, and if the seat class is also identified. In addition, under the condition that a database is prepared, which stores information of the audio reproduction device that is installed at each seat number or in each seat area, it is also obvious that the information of the seat number or the seat area can be the information for uniquely identifying the type and performance of the audio reproduction device. In addition, if the IP address is given to the audio reproduction device by a certain rule (for example, if a fixed IP address is given, or if the IP addresses are given with different subnets for different seat areas), it is also obvious that the IP address can be the information for uniquely identifying the type and performance of the audio reproduction device.

In addition, the information may be used solely, or two or more thereof may be combined and used. In this embodiment, it is supposed that information of combination of the seat class and the flight number is used as the application destination identifying information.

As described above, the application destination identifying information is generated by the audio reproduction device identifying section 103. For instance, the audio reproduction device identifying section 103 uses the device installation environment database DB103 so as to generate the application destination identifying information corresponding to the identified audio reproduction device. As described above, the device installation environment database DB103 is a database storing the correspondence relationship between the installation environment of the audio reproduction device and the information for identifying the audio reproduction device. The audio reproduction device identifying section 103 uses the pair device identifying information so as to identify the audio reproduction device that is used with the earphone. Therefore, using the device installation environment database DB103, it is possible to acquire the installation environment of the audio reproduction device. Apart or the whole of the information acquired in this way is used as the application destination identifying information.

Note that, as the application destination identifying information, if the information having the same content as the pair device identifying information is used, or if the information for identifying the audio reproduction device, which is identified by the audio reproduction device identifying section 103 (for example, the model of the audio reproduction device) is used, conversion of information using the device installation environment database DB103 is not necessary.

Note that "to store in association with" means to store in the state where the information about equalizer setting corresponding to certain application destination identifying information can be retrieved using the application destination identifying information as a retrieval key. For instance, there is a method of storing the application destination identifying information as a key, and the information about equalizer setting as a value, in a KVS type database. Other than that, there is also a method of setting a file name of a file of the information about equalizer setting to match the application destination identifying information.

[1-3. Application of Information about Equalizer Setting]

[1-3-1. Structure]

As illustrated in FIG. 5, the equalizer information application system 200 includes a device setting server 210 and the audio reproduction device 220. As an example, it is supposed that there are three audio reproduction devices 220 for description, but there may be only one audio reproduction device, or two or more audio reproduction devices. If there are a plurality of the audio reproduction devices, they may have the same software or hardware, or they may have different software or hardware having equivalent functions. Here, the audio reproduction device may be, for example, a cabin entertainment system installed at each seat in the aircraft.

The device setting server 210 is software or hardware that can read data stored in a storage medium 211 via the storage medium interface 105. The device setting server 210 may be a dedicated device whose main purpose is to set the audio reproduction device, or may be a device whose main purpose is to provide another function. For instance, it may have a structure that also works as a video server for streaming a sound source to each audio reproduction device.

The storage medium 211 is software or hardware for storing information 212 about equalizer setting and application destination identifying information 213. The storage medium 211 may be a storage medium such as an HDD, an SSD or a memory included in or attached to the device setting server 210, or may be a storage medium included in or attached to the audio reproduction device 220. In the following description, it is supposed that the storage medium is the HDD externally attached to the device setting server. The storage medium interface 105 is software or hardware having a function of electrically communicating with the storage medium 211 so as to read data stored in the storage medium 211.

The information 212 about equalizer setting is generated by the equalizer information generating system 100. As described above, the information 212 about equalizer setting may be equalizer setting itself, or may be information that is used by the equalizer setting section 223 of the audio reproduction device 220 for generating an equalizer setting value. In the following description, it is supposed that the information is the equalizer setting itself.

The application destination identifying information 213 is generated by the equalizer information generating system 100. As described above, the application destination identifying information 213 is information for identifying the device for reading the information 212 about equalizer setting. In the following description, it is supposed that the information is information of a combination of the flight number in which the audio reproduction device is used and the seat class in which the audio reproduction device is installed.

The audio reproduction device 220 is an audio reproduction device that the passenger in the aircraft uses, and is hardware including an audio reproduction section 224, an equalizer 225, an earphone jack 226, and the device ID storage section 227. In addition, the audio reproduction device 220 may be hardware including one or more of a device identifying section 221, an equalizer information reading section 222, and the equalizer setting section 223. In this embodiment, it is supposed that the device identifying section 221, the equalizer information reading section 222, and the equalizer setting section 223 are included in the audio reproduction device 220.

The device identifying section 221 is software having a function of acquiring using device identifying information for identifying the audio reproduction device 220 that the passenger is using, from the device ID storage section 227 or the operation information server 230.

Here, the using device identifying information is information necessary for selecting one of information 212 about equalizer setting stored in the storage medium 211, which is optimal for the audio reproduction device 220. As described above, the storage medium 106 stores the information about equalizer setting so that it can be retrieved using the application destination identifying information 213 as a key. In other words, the using device identifying information is a retrieval key for performing the retrieval.

Here, the device ID storage section 227 is a nonvolatile memory or a volatile memory included in the audio reproduction device 220. The information unique to the audio reproduction device 220 and the information about installation environment, for example, the information about the seat class in which the audio reproduction device 220 is installed, the information for identifying the seat location in which the audio reproduction device 220 is installed (for example the seat number), the information for identifying the IP address given to the audio reproduction device, and information of the model of the audio reproduction device are stored in the memory included in the audio reproduction device 220 when the audio reproduction device 220 is manufactured, or when it is installed in the aircraft, or when the device is activated.

In addition, the operation information server 230 is a server that stores information about operation of the aircraft in which the audio reproduction device 220 is installed, and that sends back the information in response to inquiry. The information about operation of the aircraft is, for example, a name or a unique symbol of the airline company that operates the airline flight, an airframe number of the aircraft, a unique symbol of the airline flight (airline flight number), a flight phase (moving in the airport, taking off, during stable flight, landing, or the like), passenger service providing situation (such as boarding or deboarding, meal serving, or requiring to fasten seat belts), or the like.

As described above, in this embodiment, it is supposed that information of combination of the airline flight number and the seat class is used as the application destination identifying information 213. Therefore, the device identifying section 221 first acquires the information about the seat class in which the audio reproduction device 220 is installed from the device ID storage section 227, and further acquires the airline flight number from the operation information server 230. These two information are combined to be the using device identifying information, which is notified to the equalizer information reading section 222.

Note that as another embodiment, if the information about the model of the audio reproduction device is used as the application destination identifying information 213, the device identifying section 221 acquires the model of the audio reproduction device 220 from the device ID storage section 227. In this way, whether or not communication to the operation information server 230 is necessary depends on the information that is used as the application destination identifying information 213, and it is needless to say that communication to the operation information server 230 is not required depending on the type of the used information.

In addition, if the device identifying section 221 cannot directly acquire the information corresponding to the using device identifying information from the device ID storage section 227 or the operation information server 230, it adopts the method of converting information acquired from the device ID storage section 227 or the operation information server 230 into the using device identifying information, by using an information conversion database (not shown). For instance, it is supposed that, although the information of the seat class is necessary as the using device identifying information, the information is not stored in the device ID storage section 227. In that case, acquire the IP address of the audio reproduction device 220 from the device ID storage section 227, and ask the information conversion database for the seat class corresponding to the IP address. In this way, by preparing in advance the database for conversion among specifications related to the audio reproduction device 220, the information acquired from the device ID storage section 227 or the operation information server 230 can be converted into the using device identifying information.

The equalizer information reading section 222 is software having a function of acquiring the information about equalizer setting stored in the storage medium 211. The equalizer information reading section 222 compares the using device identifying information acquired by the device identifying section 221 with the application destination identifying information 213 stored in the storage medium 211, and identifies the information about equalizer setting that is optimal for the audio reproduction device 220. For instance, if the airline flight number and the seat class are used as the application destination identifying information 213, and if the using device identifying information is "business class in flight number NH102", the equalizer information reading section 222 searches for the application destination identifying information 213 using the retrieval key "business class in flight number NH102", and the information 212 about equalizer setting associated with the retrieved application destination identifying information 213 is to be read. In this way, the audio reproduction device 220 can read the information about equalizer setting that is appropriate for itself.

The equalizer setting section 223 is software having a function of setting the parameters of the equalizer 225 based on the information about equalizer setting acquired by the equalizer information reading section 222. The equalizer setting section may use the information about equalizer setting as it is, so as to set the parameters of the equalizer, or may edit the information about equalizer setting so as to set the parameters of the equalizer.

The audio reproduction section 224 is software or hardware having a function of decoding audio data that is reproduced by the audio reproduction device. The audio data is provided from, for example, a streaming server or a file server (which may be in the aircraft, or may be outside of the aircraft, for example, on the ground), a media file included in the audio reproduction device, or the like.

The equalizer 225 is software or hardware having a function of changing frequency characteristics of sounds decoded by the audio reproduction section 224. The audio data processed by the equalizer 225 is output to an earphone 228 via the earphone jack 226.

The earphone jack 226 is a connector for connecting the earphone. The earphone jack may be a connector for outputting an analog audio signal, or may be a connector for outputting a digital audio signal. Note that if the earphone is connected by wireless means such as Bluetooth (registered trademark), the earphone jack 226 is not necessary.

The earphone 228 is an earphone that a passenger uses. The earphone is provided to the passenger by the airline company for use in the aircraft.

In this embodiment, as described above, it is supposed that the device identifying section 221, the equalizer information reading section 222, and the equalizer setting section 223 are included in the audio reproduction device 220, but they are not necessarily provided to the audio reproduction device 220. They may be provided to the device setting server 210 or another server or device that is not illustrated in FIG. 5. Even if they are not included in the audio reproduction device 220, if only the audio reproduction device 220 provides API that enables acquisition of the device ID or equalizer setting thereof via the network, the device identifying section 221, the equalizer information reading section 222, or the equalizer setting section 223, which is disposed externally, can display a target function.

[1-3-2. Operations]

Figure 6:
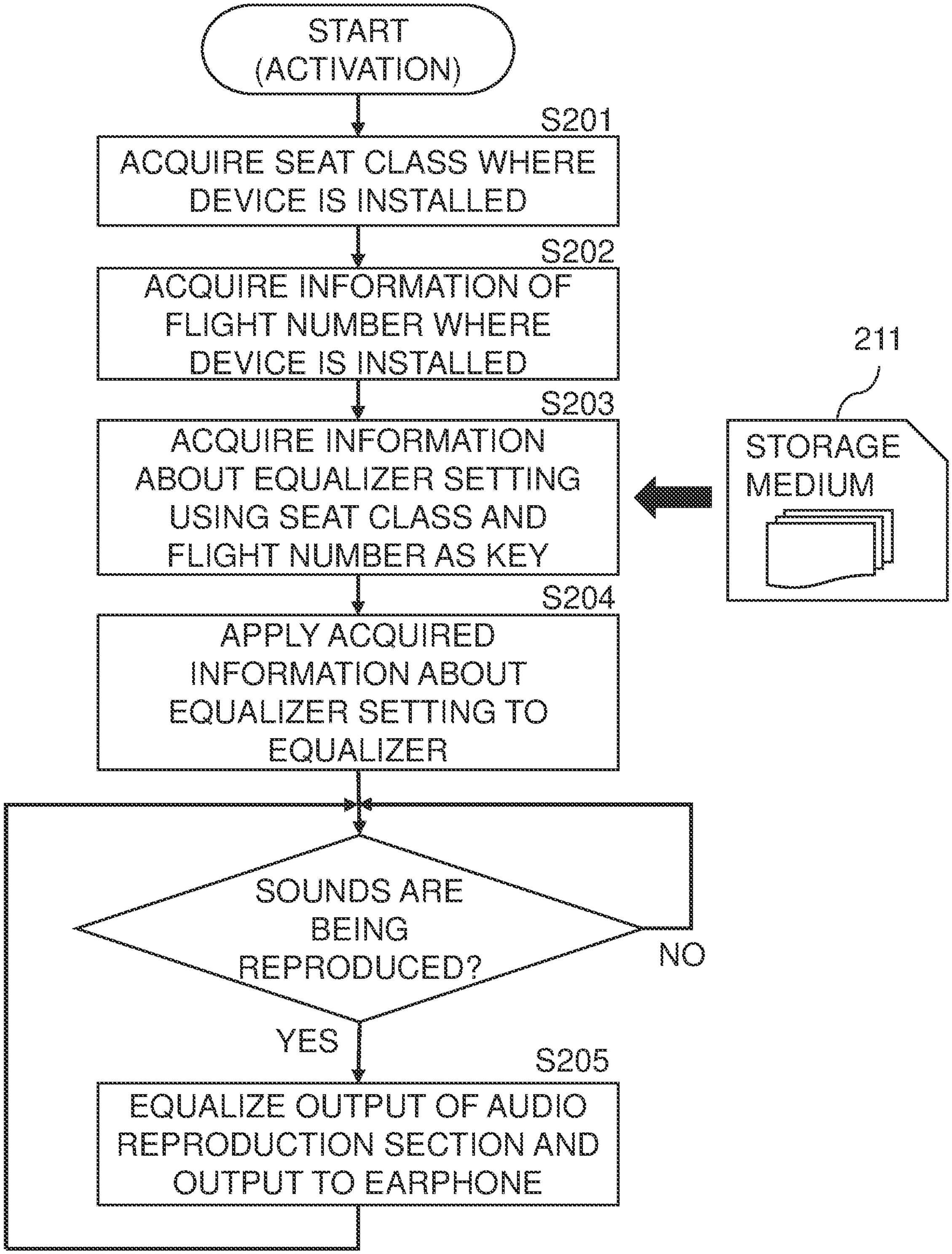
FIG. 6 is a flowchart illustrating an operation of the equalizer setting information application system according to Embodiment 1.

Details of operations of the equalizer information application system 200 are described with reference to FIG. 6. Here, it is supposed that, according to the sequence illustrated in FIG. 3 and the flow illustrated in FIG. 4, the equalizer information generating system 100 generates the information about equalizer setting and the application destination identifying information, and the generated information are copied to the storage medium 211.

When the audio reproduction device 220 is activated, the device identifying section 221 acquires specification of the audio reproduction device 220 from the device ID storage section 227 included in the audio reproduction device 220. In this embodiment, information that must be at least acquired from the device ID storage section 227 is information about the seat class in which the audio reproduction device 220 is installed (S201).

When the device identifying section 221 prepares the using device identifying information, if the information from the device ID storage section 227 is not sufficient, it makes access to the operation information server 230 so as to acquire necessary flight operation information. In this embodiment, information that must be at least acquired from the operation information server 230 is information about the airline flight number (S202).

The equalizer information reading section 222 makes access to the storage medium 211, and uses the using device identifying information prepared by S202 as a retrieval key so as to identify the application destination identifying information 213 corresponding thereto. Then, the information about equalizer setting associated with the application destination identifying information 213 is read (S203).

The equalizer setting section 223 uses the information about equalizer setting read by the equalizer information reading section 222 so as to set the equalizer 225 (S204).

Note that the equalizer setting section may use the information about equalizer setting as it is, so as to set the parameters of the equalizer, or may edit the information about equalizer setting so as to set the parameters of the equalizer.

When the audio reproduction device 220 reproduces sounds, the equalizer 225 adjusts output audio frequency characteristics according to the information set in S204. The adjusted sounds are output to the earphone 228 (S205).

By the procedure described above, the audio reproduction device can output sounds with optimal equalizer setting for the earphone that is provided with the audio reproduction device by the airline company. For instance, also in the case where different earphones are provided to economy class and business class in the aircraft from the airline company, it is possible to perform optimal equalizer setting for the earphone of each class with respect to the audio reproduction device.

[1-4. Effects]

Using the equalizer information generating system and the equalizer information setting system as described above, even in the case where the airline company uses different audio reproduction devices and provides different earphones to passengers according to the flight route or the seat class of the aircraft, equalizer setting of the audio reproduction device can be appropriately performed. In this way, the passenger can use equalizer setting appropriate for the using earphone provided from the airline company, without being conscious of conditions such as the audio reproduction device in use or the seat class, and can listen to sounds after appropriate audio tone correction.

[1-5. Variations]

One or more structural elements of the device identifying section 221, the equalizer information reading section 222, and the equalizer setting section 223 may be disposed not in the audio reproduction device but in the server to which the audio reproduction device is connected.

One or more structural elements of the device identifying section 221, the equalizer information reading section 222, and the equalizer setting section 223 may be disposed not in the server or in the audio reproduction device but in other hardware. For instance, they may be in a device disposed between the server and the audio reproduction device so as to relay power supply or a communication signal.

The equalizer 225 may be disposed not in the audio reproduction device but in the server to which the audio reproduction device is connected so as to provide sound sources. In this case, the server transmits to the audio reproduction device the audio data after changing the frequency characteristics in accordance with the audio reproduction device.

The storage medium 211 that stores the information 212 about equalizer setting and the application destination identifying information 213 may be disposed in the audio reproduction device or in other hardware.

The information 212 about equalizer setting and the application destination identifying information 213 may be stored in different storage media.

The audio reproduction device 220 may further include an input receiving section that receives an input from the user, and the equalizer information reading section 222 may read the information about equalizer setting based on the input received by the input receiving section.

The equalizer information application system 200 may further include an operation terminal that receives an input from a flight attendant of the aircraft, and the equalizer information reading section 222 may read the information about equalizer setting based on the input received by the operation terminal that receives the input from the flight attendant.

The equalizer information generating system 100 and the equalizer information application system 200 may be a single system. For instance, the audio reproduction device 220 includes the earphone identifying section 101, the earphone characteristic acquiring section 102, the audio reproduction device identifying section 103, the equalizer information generating section 104, and the storage medium interface 105. According to the flow illustrated in FIG. 2, the audio reproduction device generates the information about equalizer setting, and stores the information about equalizer setting in the storage medium included in the audio reproduction device or the server.

Acquisition of the information about equalizer setting by the equalizer information reading section 222 and the equalizer setting by the equalizer setting section 223 are not necessarily performed every time when the information reproduction device is activated. For instance, they may be performed if the information for identifying the audio reproduction device that the passenger is using, which is acquired by the device identifying section 221, is different from that acquired last time of activation, or they may be performed in accordance with the input from the user or the input from the flight attendant as described above.

The earphone database DB101 is not always necessary. In this case, the information for identifying the earphone may be input as external information every time when an equalizer information creator generates the equalizer information.

Embodiment 2

Hereinafter, with reference to FIGS. 7 to 12, Embodiment 2 is described.

Embodiment 2 is largely different from Embodiment 1 in the following point. The audio reproduction device of Embodiment 1 reads the prepared information about equalizer setting and uses it as it is, while the device of Embodiment 2 generates more appropriately optimized equalizer information and uses the same, in accordance with the environment in which the audio reproduction device is installed.

[2-1. Overall Structure of System]

Also in Embodiment 2, similarly to Embodiment 1, the audio tone correction system is constituted of the equalizer information generating system and the equalizer information application system. Structures of an equalizer information generating system 900 and an equalizer information application system 1100 of Embodiment 2 are the same as the structures of the equalizer information generating system and the equalizer information application system of Embodiment 1, except for the following description.

Figure 9:
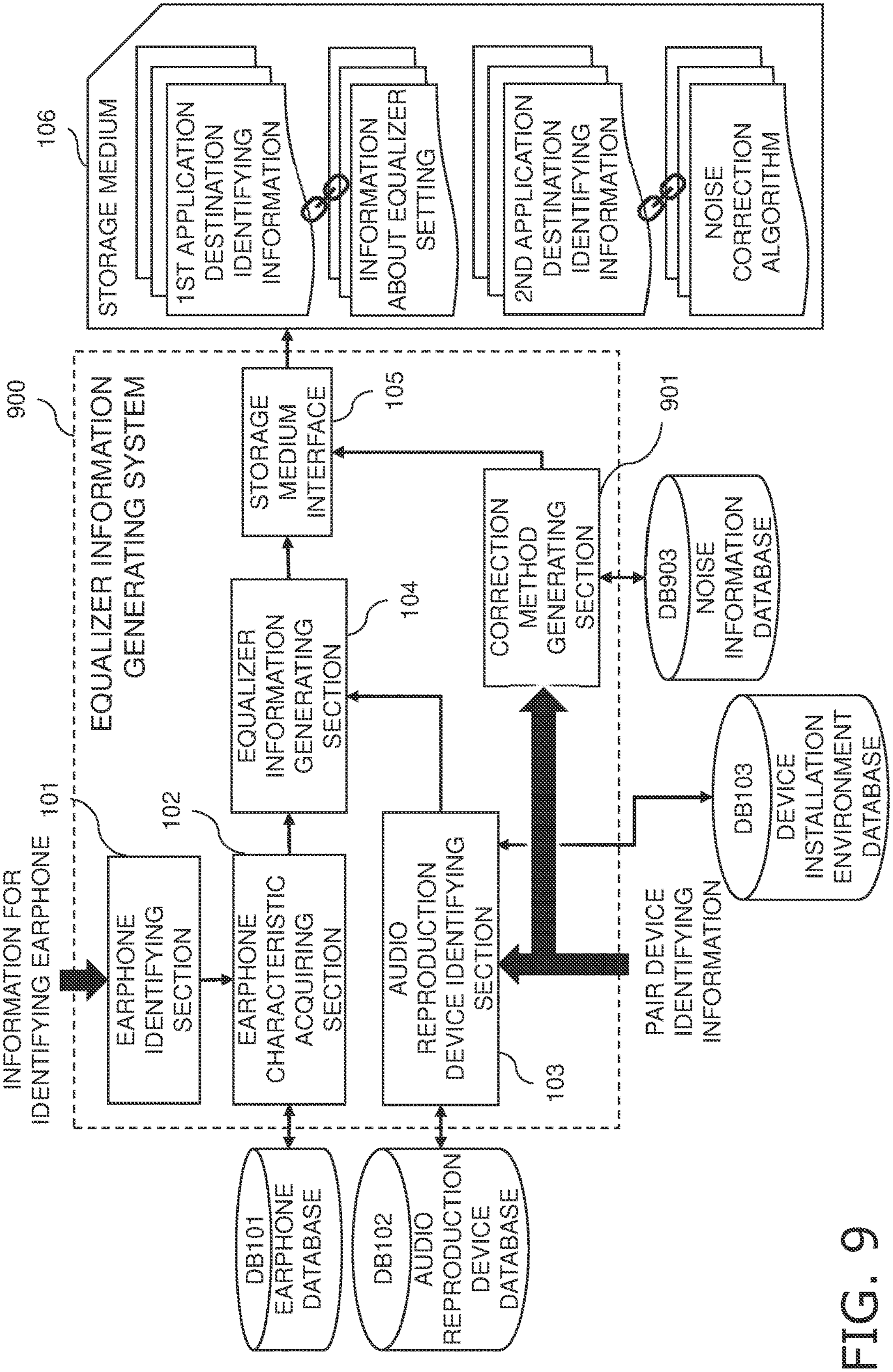
FIG. 9 is a structural diagram of the equalizer setting information generating system according to Embodiment 2.

FIG. 9 is a block diagram illustrating the structure of the equalizer information generating system 900 according to Embodiment 2. Note that the same structural element as in FIG. 1 of Embodiment 1 is denoted by the same numeral.

Similarly to the equalizer information generating system 100 of Embodiment 1, the equalizer information generating system 900 has a function of generating the information about equalizer setting, in accordance with characteristic of the earphones provided by an airline company for use in the aircraft and characteristics of the audio reproduction device that is used with the earphone. In addition, it has a function of generating information for further correcting the equalizer setting (hereinafter, referred to as a noise correction algorithm), in accordance with the environment in which the audio reproduction device is installed. The noise correction algorithm means an algorithm of changing the equalizer setting in accordance with installation environment of the audio reproduction device. For instance, in accordance with a distance between the seat at which the audio reproduction device is installed and an engine, an emphasis degree of a frequency range corresponding to engine noise may be adjusted.

Figure 11:
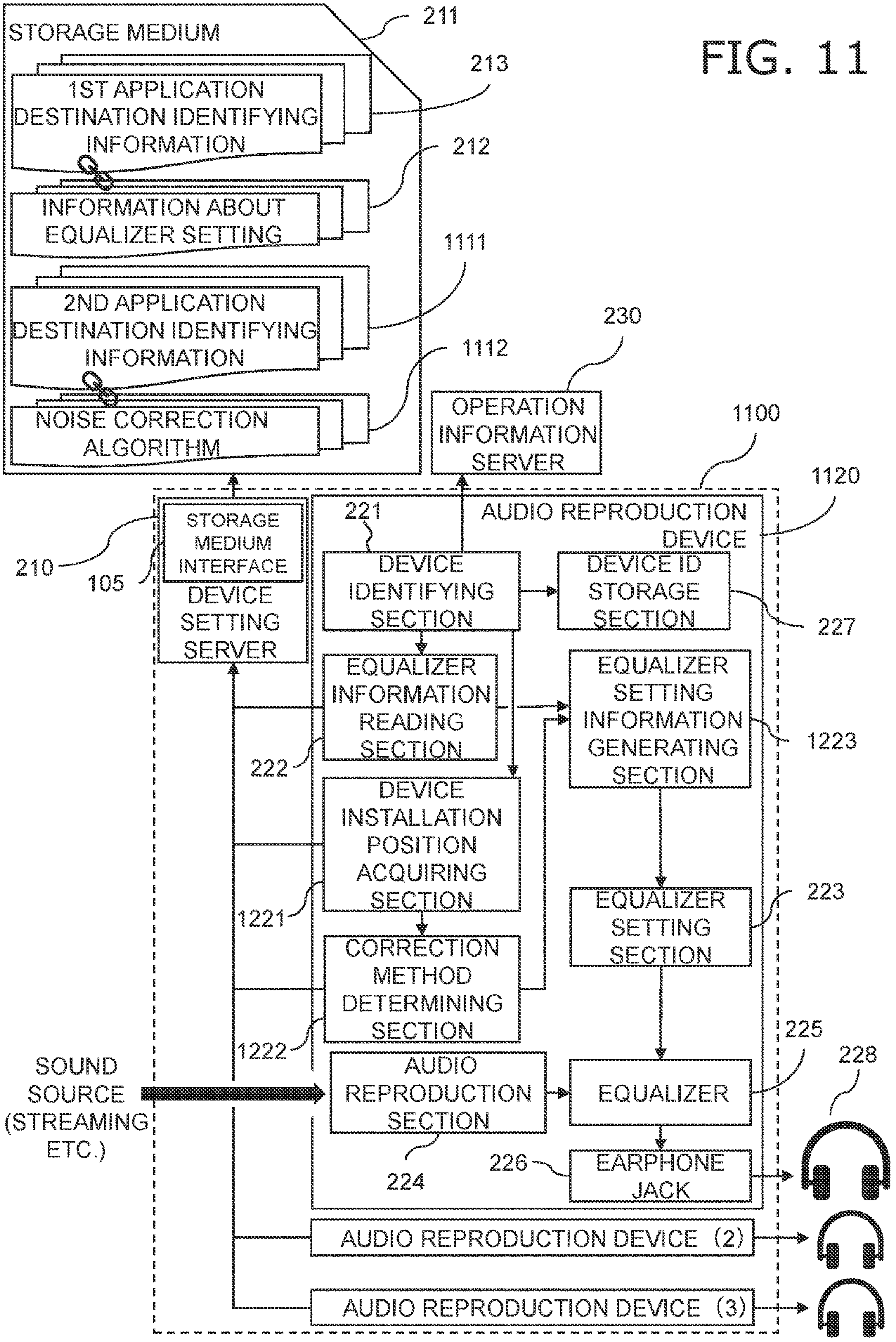
FIG. 11 is a structural diagram of the equalizer setting information application system according to Embodiment 2.

FIG. 11 is a block diagram illustrating a structure of the equalizer information application system 1100 according to Embodiment 2. Note that the same structural element as in FIG. 5 of Embodiment 1 is denoted by the same numeral.

Similarly to Embodiment 1, the equalizer information application system 1100 has a function of reading information about equalizer setting that is optimal for the audio reproduction device from the storage medium, and setting the same to the equalizer. In addition, it has a function of reading the noise correction algorithm in accordance with the environment in which the audio reproduction device is installed from the storage medium, and optimizing the equalizer setting for the environment in which the audio reproduction device is installed.

The information about equalizer setting and the noise correction algorithm are prepared separately in order to reduce a data size. If the information about equalizer setting is prepared considering the installation environment of the audio reproduction device in advance, it is necessary to prepare a number (the product of the number of the application destination identifying information and the number of variations of the installation position) of types of the information about equalizer setting. However, as described later, the method of equalizer correction at each installation position does not depend on the audio reproduction device or the characteristics of the earphone, and most elements thereof can be adopted commonly. Therefore, by adopting the structure in which the equalizer setting obtained from the information about equalizer setting is corrected afterward using the noise correction algorithm, the number of data can be reduced to be a number (the sum of the number of the application destination identifying information and the number of variations of the installation position).

Furthermore, even if the airline company changes the model of the earphone to another type, or changes the model of the audio reproduction device, the noise correction algorithm is not affected. Therefore, there is also a merit that data of the noise correction algorithm can be used as it is. In addition, there is also a merit that the noise correction algorithm can be used without remaking for another airline company that uses the same airframe but uses a different audio reproduction device or a different earphone.

[2-2. Generation of Information about Equalizer Setting]

[2-2-1. Structure]

As illustrated in FIG. 9, the equalizer information generating system 900 according to Embodiment 2 is a system obtained by adding a correction method generating section 901 to the equalizer information generating system 100 of Embodiment 1 illustrated in FIG. 1.

The correction method generating section 901 is software or hardware, which acquires environment where the audio reproduction device is installed based on the information acquired from the pair device identifying information, and estimates a noise situation corresponding to the environment. Furthermore, it generates an equalizer correction algorithm corresponding to the acquired noise situation.

Here, the environment where the audio reproduction device is installed means parameters necessary for estimating noise characteristics at each position where the audio reproduction device is installed. For instance, it is information such as an aircraft type, a type of engines of the aircraft, and a seating layout of the aircraft. If these parameters are identified, it is possible to accurately estimate the noise situation in the aircraft such as engine noise and wind noise (a frequency distribution of the noise and a manner in which the noise is distributed in the aircraft), on the basis of a result of measurement in advance or a result of simulation. On the basis of the estimation result, noise characteristics at each seat location can be estimated.

However, it is not essential that the correction method generating section 901 should acquire the pair device identifying information. It is because if the aircraft type is known, or if versatile parameters are used, the equalizer correction algorithm is naturally determined to be one.

In addition, when the correction method generating section 901 estimates noise characteristics at each seat location, it may refer to information of a noise information database DB903. The noise information database DB903 is a database that enables retrieval of the noise situation in the aircraft using specification of the environment in which the audio reproduction device is installed as a key. For instance, the database may be constituted so that noise characteristics at a seat location can be acquired using the model name of the aircraft and the seat location where the audio reproduction device is installed as a key. The noise characteristics database may be included in the equalizer information generating system 900, or may be disposed outside of the equalizer information generating system 900. Here, the "seat location" is not necessarily an accurate seat number or accurate seat coordinates. For instance, it may be information of one of areas to which the seat belongs when the inside of the aircraft is divided into some areas (hereinafter, the information is referred to as a seat area), or may be information about the seat class. Seats that are close to each other usually have similar noise characteristics, and hence it is better to handle the seats not one by one but as a group in a certain extent of area, so that data quantity can be reduced and processing can be simplified.

Furthermore, the correction method generating section 901 generates the noise correction algorithm on the basis of the noise characteristics at each location estimated by the above procedure. As described above, the noise correction algorithm is an algorithm of changing the equalizer setting in accordance with the installation environment of the audio reproduction device. Specifically, it may be a value of increasing or decreasing the gain for each frequency band of the equalizer, or a calculation procedure for changing frequency characteristics of the equalizer, or a parameter to be used in the calculation.

Figure 7:
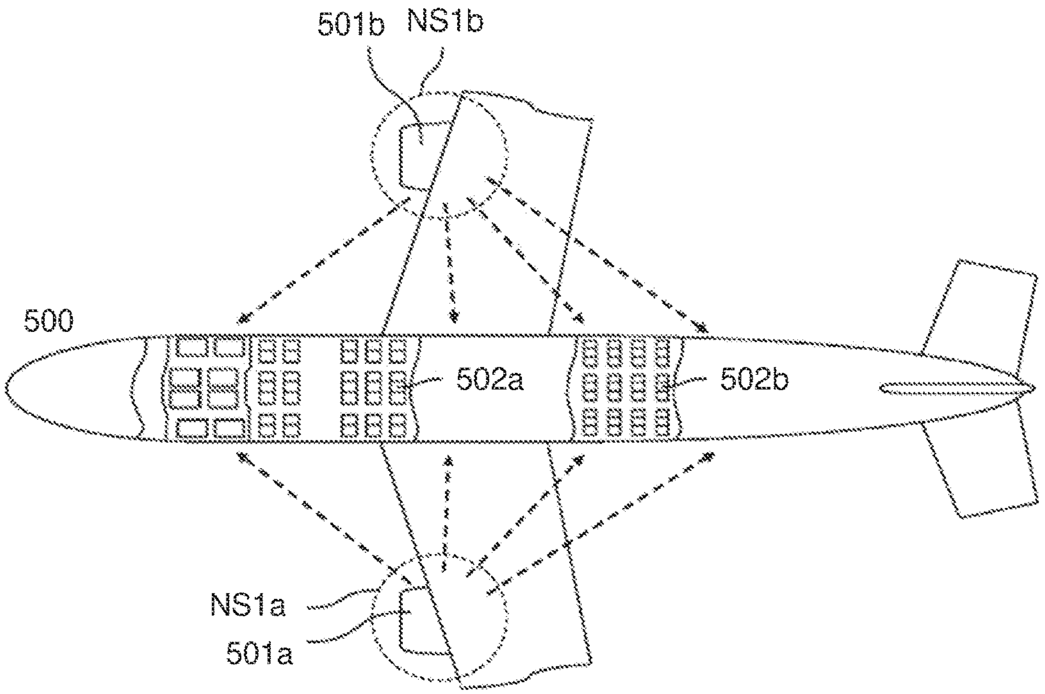
FIG. 7 is a diagram illustrating a positional relationship between noise sources and audio reproduction devices in an aircraft.
Figure 8:
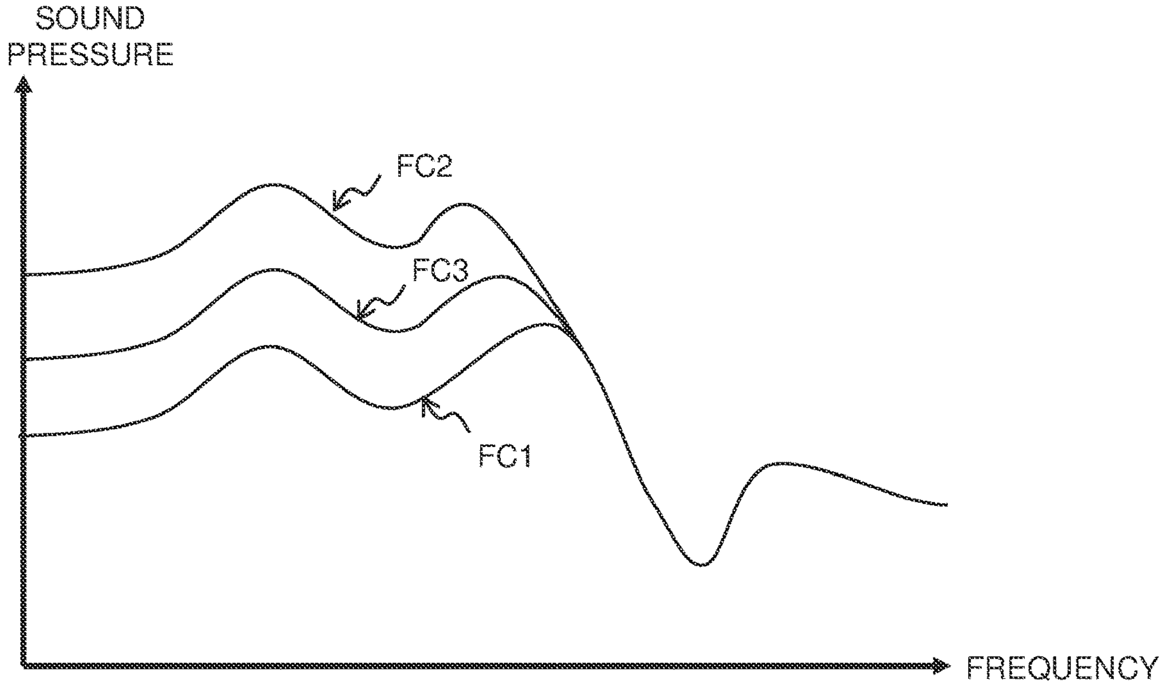
FIG. 8 is a diagram illustrating an example of change of acoustic characteristics according to seat location.

For instance, an aircraft 500 illustrated in FIG. 7 has engines 501*a* and 501*b*, which generate noises NS1*a* and NS1*b*, respectively. In this case, the influence of the generated noise differs depending on the seat location. For instance, the influence of the noise from the engine is large at a seat 502*a* close to the engine, while the influence of the noise generated from the engine is small at a seat 502*b* far from the engine. As an example, equalizer setting in this case is illustrated in FIG. 8. In FIG. 8, FC1 indicates equalizer setting in the case without correction. At the seat 502*a* near the engine, the influence of the noise from the engine is large, and hence sounds at frequencies corresponding to the engine noise are masked and are hard to hear. Therefore, the equalizer setting is corrected to have acoustic characteristics FC2 in which sound pressures at frequencies corresponding to the engine noise are increased. In contrast, at the seat 502*b* far from the engine, the influence of the noise from the engine is small, and hence there is a problem that the correction will be excessive if the same acoustic characteristics FC2 for the seat 502*a* are adopted. Therefore, at the seat 502*b*, the equalizer setting is corrected to have acoustic characteristics FC3 in which sound pressure correction at frequencies corresponding to the engine noise is smaller than that of the acoustic characteristics FC2 at the seat 502*a*. In this way, acoustic characteristics are corrected in accordance with the positional relationship between the noise source and the audio reproduction device, and hence it is possible to reproduce sounds with optimal acoustic characteristics appropriate for the position of the audio reproduction device.

Note that the correction method generating section 901 may generate different noise correction algorithms for different types of the audio reproduction devices to be used. It is because the audio reproduction device has different acoustic reproduction characteristics for different types, and hence the acoustic characteristics can be corrected more precisely by generating different noise correction algorithms for different audio reproduction devices.

The storage medium interface 105 has a function of storing in the storage medium 106 the information about equalizer setting and the application destination identifying information (hereinafter, referred to as "first application destination identifying information" in order to distinguish from the application destination identifying information of the noise correction algorithm), in association with each other, as described above in Embodiment 1, and in addition, the noise correction algorithm generated by the correction method generating section 901 and information for identifying the audio reproduction device to which the noise correction algorithm is applied (hereinafter, referred to as "second application destination identifying information") in association with each other.

The second application destination identifying information is generated by the correction method generating section 901 on the basis of the pair device identifying information. The second application destination identifying information is information for the audio reproduction device to acquire the optimal noise correction algorithm using the information as a key. For instance, it may be information about the seat location (the seat number or the seat area), or may be information about the airframe (the type, the number of engines, and the seating layout). However, if the noise correction algorithm is a single algorithm (for example, it may be a formula using the seat location as a parameter), the second application destination identifying information is not necessary, and it is sufficient that the noise correction algorithm is stored solely in the storage medium 106.

In this embodiment, it is supposed that the second application destination identifying information is a combination of the model name of the aircraft and the seat area in which the audio reproduction device is installed.

[2-2-2. Operations]

Figure 10:
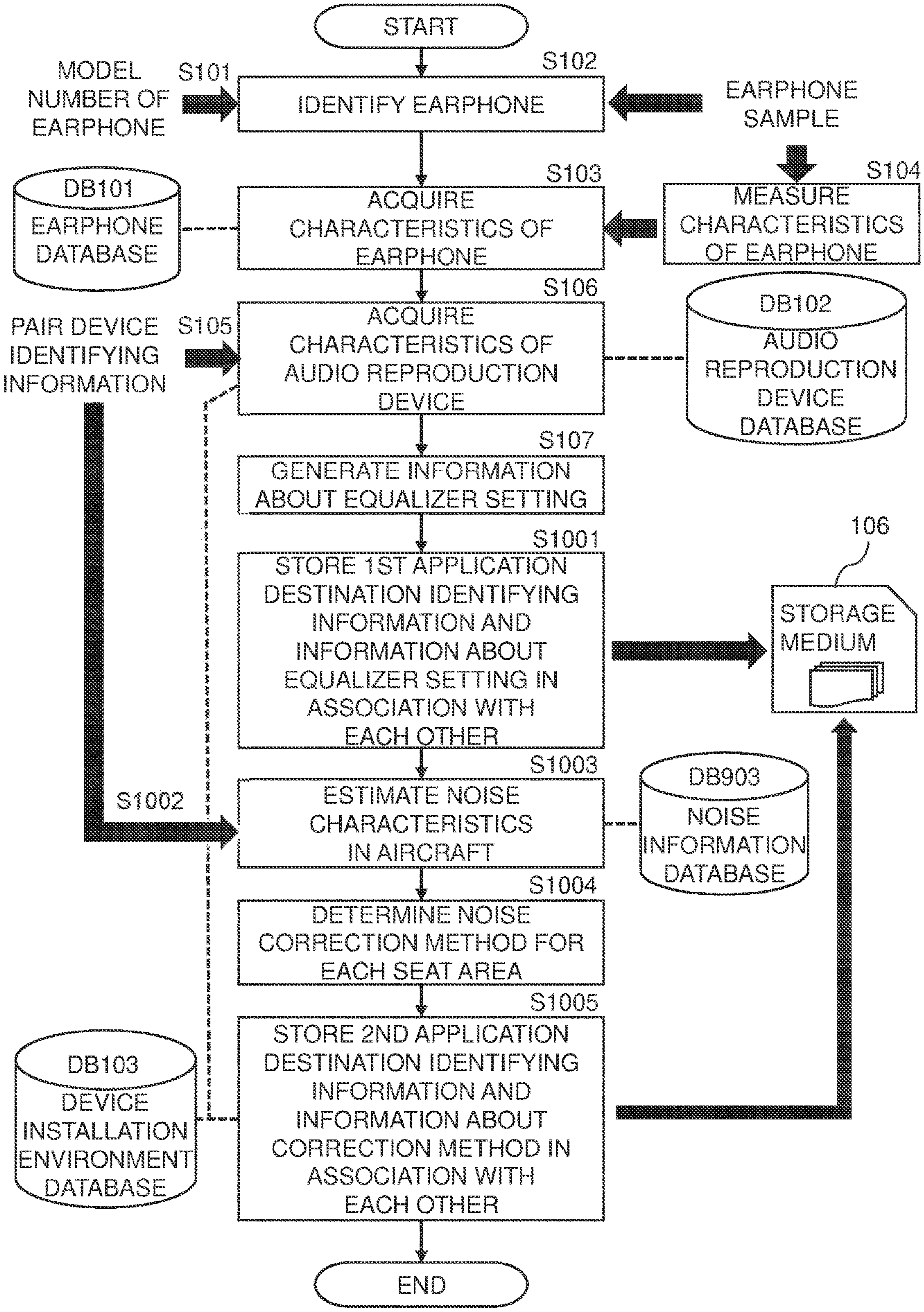
FIG. 10 is a flowchart illustrating an operation of the equalizer setting information generating system according to Embodiment 2.

Details of operations of the equalizer information generating system 900 are described with reference to FIG. 10.

The operations of S101 to S107 are the same as those described above in Embodiment 1.

The storage medium interface 105 stores the information about equalizer setting in the storage medium 106. In this case, the storage medium interface 105 stores the first application destination identifying information (that is the same as the "application destination identifying information" described above in Embodiment 1) in association with the information about equalizer setting (S1001).

The correction method generating section 901 refers to the pair device identifying information, so as to acquire the parameter necessary for estimating noise characteristics in the aircraft. As described above, the pair device identifying information is information for identifying the audio reproduction device that is used with the earphone identified in S102. It is considered that this information also include information such as the model name of the aircraft in which the earphone identified in S102 is used. In addition, even if the model name of the aircraft or the information about setting of the airframe is not directly included in the pair device identifying information, it is easy to convert information included in the pair device identifying information (such as the airline flight number or the airline company) into the information (S1002).

The correction method generating section 901 estimates the noise characteristics in the aircraft based on the parameter acquired in S1002. The method for estimating the noise characteristics is already described above in the description of the correction method generating section 901 (S1003).

The correction method generating section 901 generates the noise correction algorithm for each seat area based on the estimation result in S1003. Note that if the noise correction algorithm is a formula using the seat location as a parameter as described above, it is not necessary to generate the noise correction algorithm for "each seat area", but it is sufficient to determine the single noise correction algorithm (S1004).

The correction method generating section 901 prepares the second application destination identifying information. As described above, the second application destination identifying information is information for the audio reproduction device to acquire the optimal noise correction algorithm using the information as a key. As described above, in this embodiment, it is information of a combination of the model name of the aircraft and the seat area in which the audio reproduction device is installed. In other words, the correction method generating section 901 generates for each noise correction algorithm generated in S1004 the corresponding model name of the aircraft and the seat area in which the audio reproduction device is installed as a retrieval key. The storage medium interface 105 stores in the storage medium 106 the noise correction algorithm generated in S1004 and the second application destination identifying information generated by the above procedure in association with each other (S1005).

[2-3. Application of Information about Equalizer Setting]

[2-3-1. Structure]

As illustrated in FIG. 11, the equalizer information application system 1100 in Embodiment 2 is a system obtained by adding a device installation position acquiring section 1221, a correction method determining section 1222, and an equalizer setting information generating section 1223 to the equalizer information application system 200 according to Embodiment 1 illustrated in FIG. 5.

The device installation position acquiring section 1221 is software or hardware for the device identifying section 221 to acquire installation environment of an audio reproduction device 1120, on the basis of information acquired from the device ID storage section 227 or the operation information server 230. Here, the installation environment means parameters necessary for estimating noise at an installation position of the device. For instance, it may be the seat number at which the audio reproduction device 1120 is installed, location information such as the seat area or the seat class, and information for identifying the noise source such as the model name of the aircraft of the installation. These information can be obtained from the device identifying section 221, as described above in Embodiment 1.

The correction method determining section 1222 is software or hardware for generating the retrieval key corresponding to second application destination identifying information 1111 based on the information acquired by the device installation position acquiring section 1221, and reading a noise correction algorithm 1112 associated with the retrieval key from the storage medium 211. In this embodiment, the model name of the aircraft and the information about the seat area in which the audio reproduction device 1120 is installed are acquired from the device installation position acquiring section 1221, and the noise correction algorithm 1112 corresponding to them is read. Note that if the noise correction algorithm 1112 stored in the storage medium 211 is a sole one, the correction method determining section 1222 does not perform generation of the retrieval key and retrieval using the key as described above, but only reads the noise correction algorithm 1112.

The equalizer setting information generating section 1223 is software or hardware for combining the information about equalizer setting read by the equalizer information reading section 222 and the noise correction algorithm read by the correction method determining section 1222, so as to generate the setting information that is given to the equalizer setting section 223. The specific correction method of equalizer setting information is already described above with reference to FIG. 8. In FIG. 8, FC1 indicates the equalizer setting determined from the information read by the equalizer information reading section 222, while FC2 and FC3 indicate the equalizer settings corrected using the read information by the correction method determining section 1222.

Note that in this embodiment, it is supposed that the device installation position acquiring section 1221, the correction method determining section 1222, and the equalizer setting information generating section 1223 are included in the audio reproduction device 1120, but they are not necessarily included in the audio reproduction device 1120. They may be provided to the device setting server 210, or may be provided to another server or device that is not illustrated in FIG. 11. Even if they are not included in the audio reproduction device 1120, if only the audio reproduction device 1120 provides API that enables acquisition of the device ID or equalizer setting thereof via the network, the same effect can be obtained.

[2-3-2. Operations]

Figure 12:
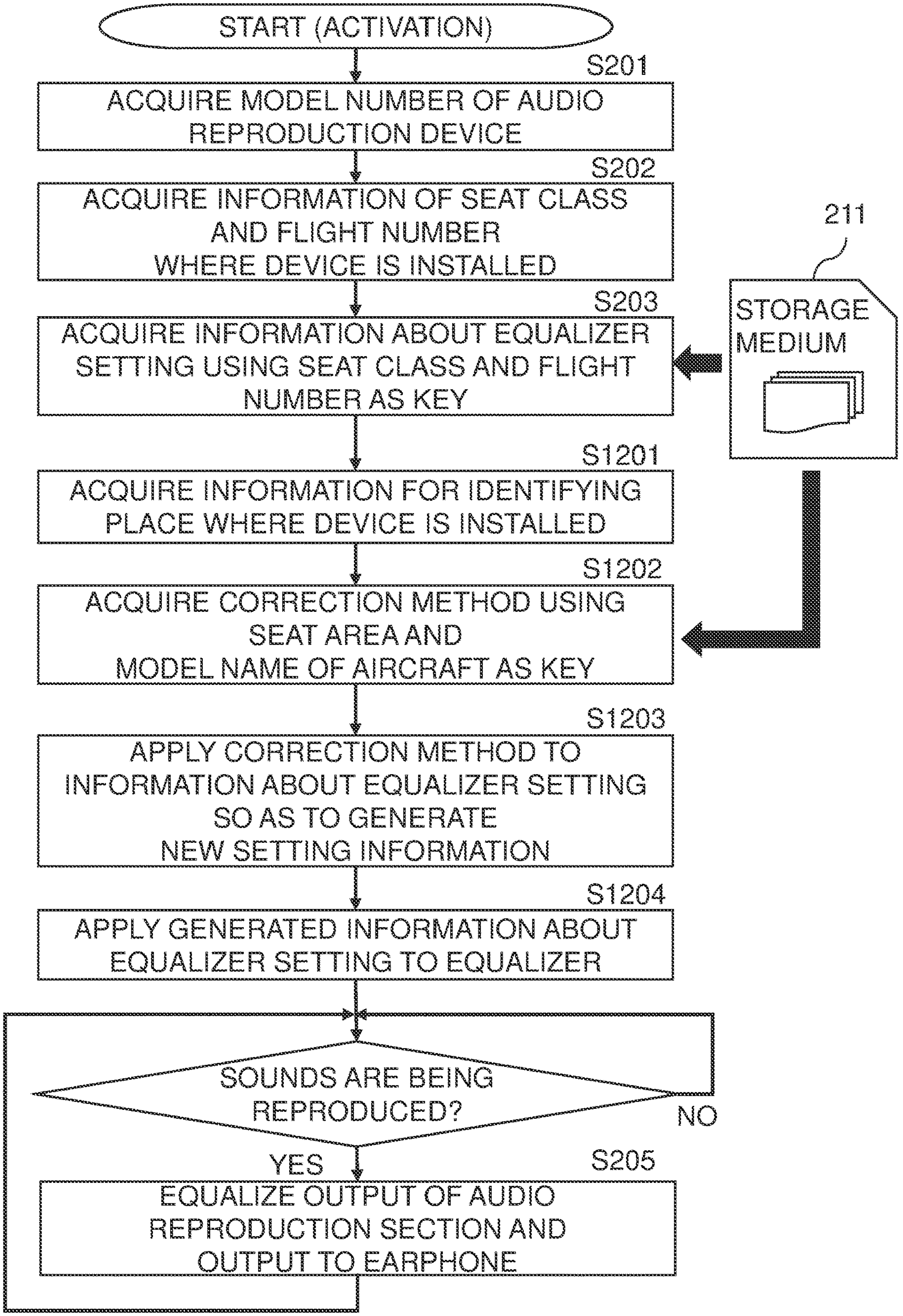
FIG. 12 is a flowchart illustrating an operation of the equalizer setting information application system according to Embodiment 2.

Details of operations of the equalizer information application system 1100 are described with reference to FIG. 12.

Operations of S201 to S203 are the same as those described above in Embodiment 1.

Note that in S203, the equalizer information reading section 222 reads the information 212 about equalizer setting, which is associated with the application destination identifying information 213 corresponding to the audio reproduction device 1120, and the read information is referred to as "first information" in the following description.

The device installation position acquiring section 1221 acquires the installation environment of the audio reproduction device 1120. As described above, the installation environment means parameters necessary for estimating noise at an installation position of the device. In this embodiment, the information about the model name of the aircraft and the information about the seat area in which the audio reproduction device is installed are acquired (S1201).

The correction method determining section 1222 generates the retrieval key based on the information acquired in S1201, and reads from the storage medium 211 the noise correction algorithm 1112 associated with the second application destination identifying information 1111 corresponding to the retrieval key. The read noise correction algorithm 1112 includes the equalizer correction method, which is optimal for the installation environment of the audio reproduction device 1120 (S1202).

The equalizer setting information generating section 1223 applies the noise correction algorithm 1112 acquired in S1202 to the first information acquired in S203, so as to generate the equalizer setting that is actually applied to the equalizer 225 (hereinafter, referred to as "second information") (S1203).

The equalizer setting section 223 sets the equalizer 225 using the second information generated in S1203 (S1204).

By the procedure described above, the passenger in the aircraft can listen to sounds after optimal audio tone correction for the using earphone provided by the airline company and the seat location, without being conscious of the earphone to be used or equalizer setting for each seat location. For instance, though the same earphones are distributed in an economy class in an aircraft, the influence of the noise generated from an engine is different between the front close to the engine and the rear far from the engine in the same economy class. Therefore, by further optimizing the optimal parameters of the equalizer for the earphone distributed to the economy class according to the seat location so as to apply the same to the equalizer, the passenger can listen to sounds with optimal acoustic characteristics at each seat, without being conscious of equalizer setting.

[2-4. Effects]

Using the equalizer information generating system and the equalizer information setting system as described above, even in the case where the airline company uses different audio reproduction devices and provides different earphones to passengers according to the flight route or the seat class of the aircraft, the passenger can experience optimal sound quality corresponding to the audio reproduction device and the seat class, and can experience further comfortable listening without being affected by noise unique to each seat.

Embodiment 3

Hereinafter, with reference to FIGS. 13 and 14, Embodiment 3 is described.

Embodiment 3 is largely different from Embodiment 1 in the following point. The audio reproduction device of Embodiment 1 is the correction method for the earphone provided by the airline company for use in the aircraft, while in Embodiment 3, it is the correction method for a commercially-supplied earphone that the passenger takes into the aircraft. Compared with earphones provided by the airline company, which are of limited types, there are various types of commercially-supplied earphones and headphones, and hence there is a problem that optimal equalizer setting cannot be derived only from information that the audio reproduction device can acquire.

In Embodiment 3, the audio tone correction system usually cannot know which type of earphone or headphone the passenger will use, before the passenger boards the aircraft, and hence it cannot generate the equalizer setting information. Therefore, the audio tone correction system of Embodiment 3 is constituted of an equalizer information setting system 1300 that works as the equalizer information generating system and the equalizer information application system.

[3-1. Structure]

Figure 13:
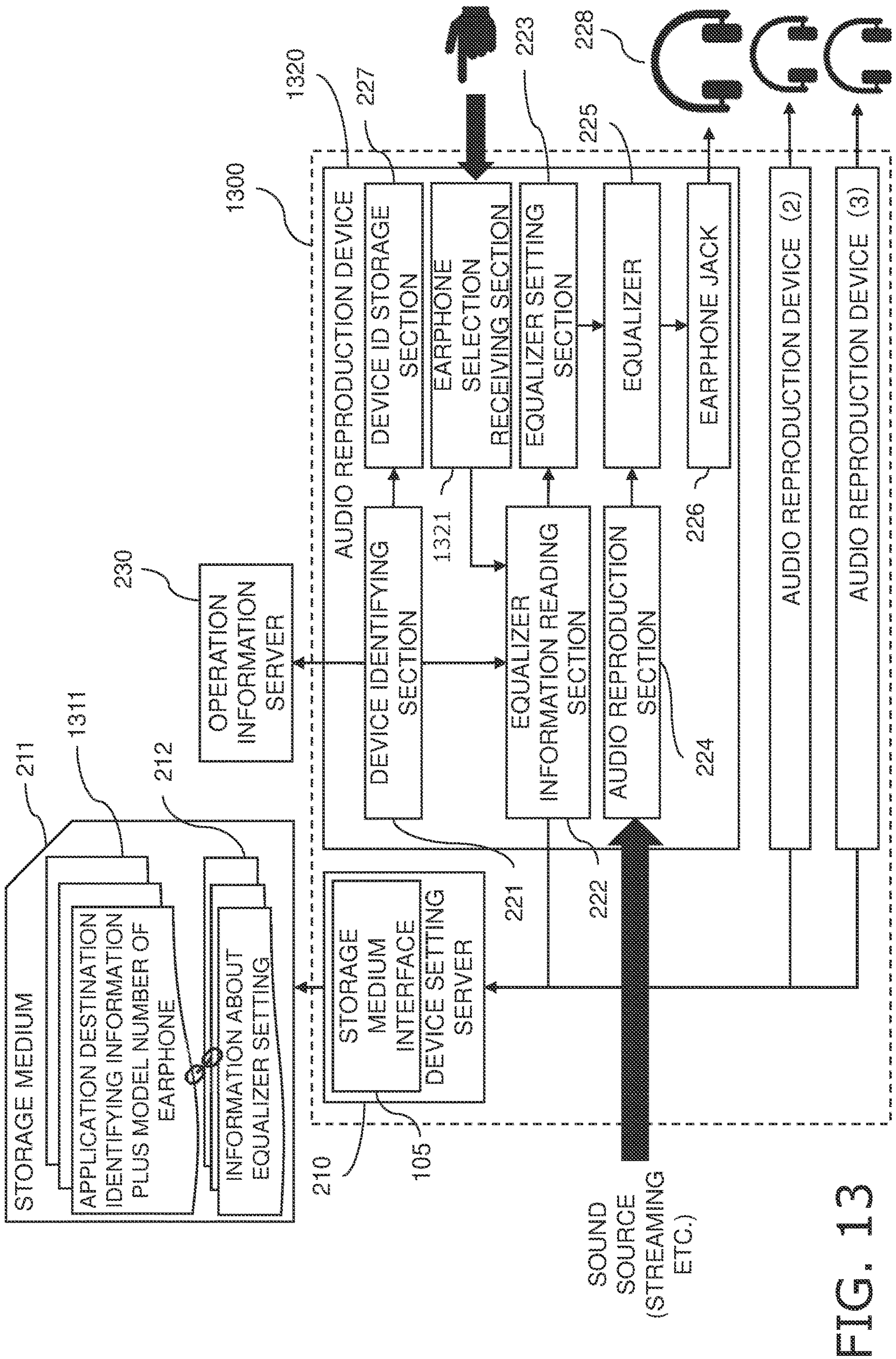
FIG. 13 is a system structural diagram of an equalizer information setting system according to Embodiment 3.
Figure 14:
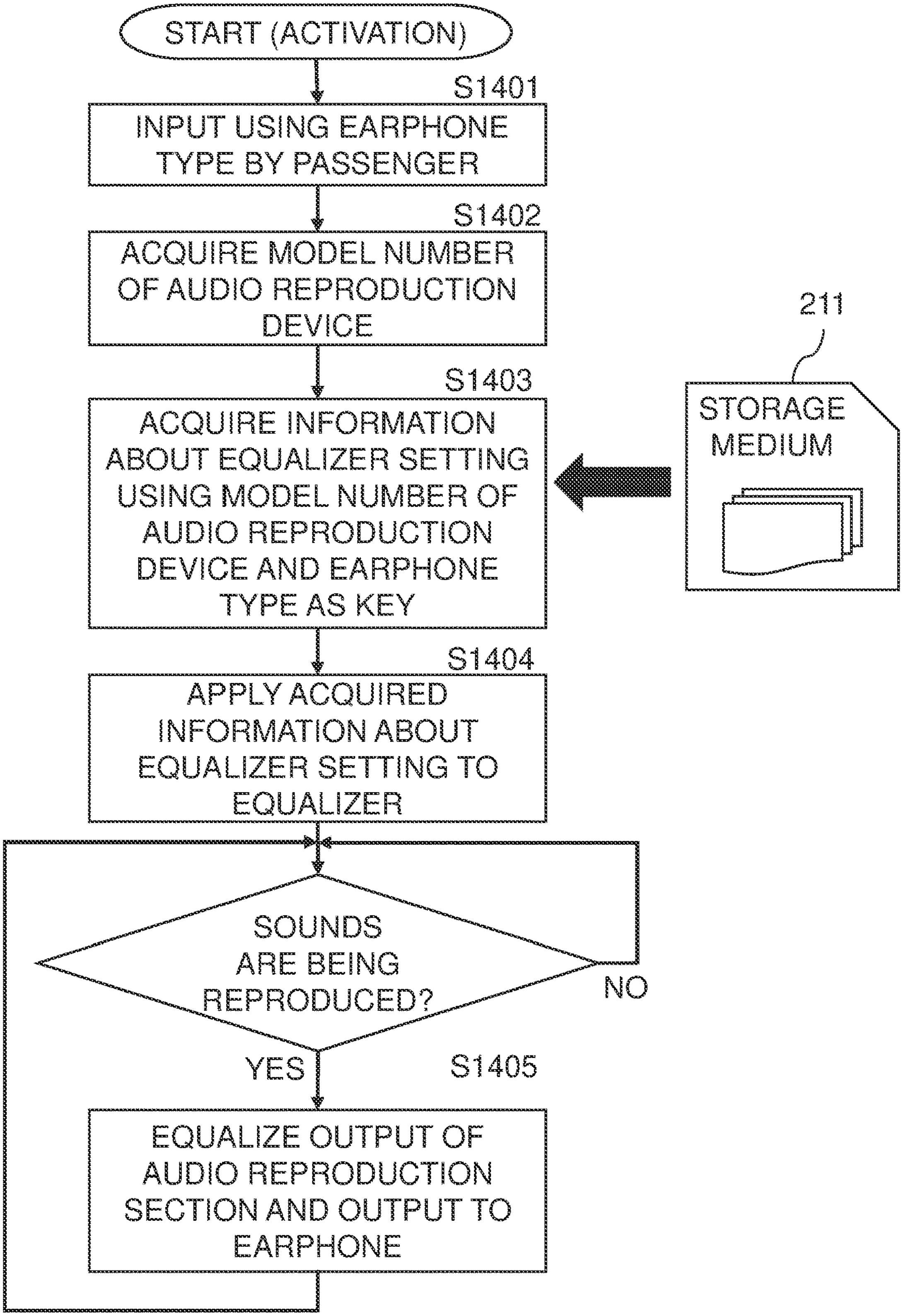
FIG. 14 is a flowchart illustrating an operation of the equalizer information setting system according to Embodiment 3.

As illustrated in FIG. 13, the equalizer information setting system 1300 according to Embodiment 3 is a system obtained by adding an earphone selection receiving section 1321 to the equalizer information application system 200 according to Embodiment 1 illustrated in FIG. 5. The equalizer information setting system 1300 of Embodiment 3 may be referred to as the equalizer information application system. In addition, the information 212 about equalizer setting is stored in the storage medium 211 in association with information 1311 that is a combination of the application destination identifying information and the earphone type. Other structure of the equalizer information setting system 1300 of Embodiment 3 is the same as the equalizer information application system 200 according to Embodiment 1.

First, the information 1311 that is a combination of the application destination identifying information and the earphone type is described.

Here, the application destination identifying information is the same as the application destination identifying information described above in Embodiment 1. In other words, it is information indicating the audio reproduction device to which the information about equalizer setting should be applied. However, in this embodiment, the earphone that is used with the audio reproduction device is taken in by the passenger, and hence characteristics of the earphone cannot be uniquely identified. Therefore, the optimal equalizer setting needs to be prepared for each of combinations of the model of the earphone and the model of the audio reproduction device. In consideration of the above situation, the information 212 about equalizer setting is associated with the information that is the combination of the application destination identifying information and the earphone type information.

Note that the "earphone type" means information necessary for identifying characteristics of the earphone. This is ideally the manufacturer and model number of the commercially-supplied earphone. It would be obvious that characteristics of the earphone can be identified accurately if the manufacturer and model number can be identified. However, it is difficult to prepare the information about equalizer setting for all model numbers of earphones available in the market. In reality, it would be appropriate to regard categories of earphones (for example "in-ear" or "over-ear", "encapsulated type" or "open type", and the like) as earphone types. In addition, it may be possible to prepare the optimal information about equalizer setting for some typical model numbers of earphones, and for other earphones to prepare the optimal information about equalizer setting for each category thereof.

The earphone selection receiving section 1321 is hardware and software for receiving an input of information about the earphone type that is used with an audio reproduction device 1320. For instance, it may be possible, as an interface, to display a list of earphone types on the screen of the audio reproduction device 1320, and to allow the passenger to select one of them by operation of a touch panel or a button. Alternatively, if the earphone is connected via a digital protocol such as Bluetooth, the device information such as the model number of the earphone may be acquired by communication with the earphone. In that case, the earphone selection receiving section 1321 receives input of the model number information acquired from the earphone.

[3-2. Operations]

Details of operations of the equalizer information setting system 1300 are described with reference to FIG. 14.

When the audio reproduction device 220 is activated, the earphone selection receiving section 1321 of the audio reproduction device 1320 acquires information about the earphone that the passenger is using. Specifically, as described above, there may be the method of allowing the passenger to select the model of the earphone that is being used, from the list displayed on the screen. In addition, as described above, if the device information can be acquired directly from the earphone, it is not necessary to urge the passenger to do the action (S1401).

The device identifying section 221 acquires specification of the audio reproduction device 220 from the device ID storage section 227 included in the audio reproduction device 220. In addition, if the information from the device ID storage section 227 is insufficient for preparing the using device identifying information, the device identifying section 221 makes access to the operation information server 230, so as to acquire necessary flight operation information. These operations are collection of information necessary for generating the application destination identifying information, and are operations corresponding to S201 and S202 in Embodiment 1. In this embodiment, it is supposed that the information acquired by the device identifying section 221 is the model number of the audio reproduction device (S1402).

The equalizer information reading section 222 makes access to the storage medium 211, and uses a retrieval key that is a combination of the earphone type acquired in S1401 and the using device identifying information prepared in S1402, so as to identify the information 1311 that is a combination of the corresponding application destination identifying information and earphone type. Then, it reads the information 212 about equalizer setting associated with the same (S1403).

The equalizer setting section 223 uses the information about equalizer setting read by the equalizer information reading section 222, so as to set the equalizer 225 (S1404).

When the audio reproduction device 220 reproduces sounds, the equalizer 225 adjusts output audio frequency characteristics in accordance with the information set in S1404. The adjusted sounds are output to the earphone 228 (S1405).

[3-3. Effects]

Using the equalizer information setting system as described above, under the environment where the airline company uses different audio reproduction devices according to the flight route or the seat class of the aircraft, even if the passenger takes in the earphone for use, it is possible to appropriately perform equalizer setting of the audio reproduction device. In this way, the passenger can use the equalizer setting appropriate for the earphone that the passenger has taken in, without being conscious of characteristics of the audio reproduction device that is being used, and can listen to sounds after appropriate audio tone correction.

INDUSTRIAL APPLICABILITY

The present disclosure can be applied to devices for optimizing output characteristics of audio reproduction devices in accordance with characteristics of an earphone to be used or environment. Specifically, the present disclosure can be applied to entertainment systems or the like used in an aircraft.

REFERENCE SIGNS LIST

100 equalizer information generating system
101 earphone identifying section
102 earphone characteristic acquiring section
103 audio reproduction device identifying section
104 equalizer information generating section
105 storage medium interface
106 storage medium
200 equalizer information application system
210 device setting server
211 storage medium
212 information about equalizer setting
213 application destination identifying information
220 audio reproduction device
221 device identifying section
222 equalizer information reading section
223 equalizer setting section
224 audio reproduction section
225 equalizer
226 earphone jack
227 device ID storage section
228 earphone
500 aircraft
501*a* engine

502*b* engine
502*a* seat
502*b* seat
900 equalizer information generating system
901 correction method generating section
1100 equalizer information application system
1111 second application destination identifying information
1112 noise correction algorithm
1221 device installation position acquiring section
1222 correction method determining section
1223 equalizer setting information generating section
1300 equalizer information setting system
1311 combination information of application destination identifying information and earphone type
1321 earphone selection receiving section
NS1*a* noise from engine
NS1*b* noise from engine
FC1 acoustic characteristics without correction
FC2 acoustic characteristics at seat 502*a*
FC3 acoustic characteristics at seat 502*b*

The invention claimed is:

1. A method for setting an aircraft entertainment system, the method comprising the steps of:

preparing first information for identifying an earphone, and second information for identifying an audio reproduction device to be used with the earphone;

identifying acoustic characteristics of the audio reproduction device from the second information;

generating equalizer setting information from a combination of (i) acoustic characteristics of the earphone identified by the first information and (ii) the acoustic characteristics of the audio reproduction device identified from the second information:

and applying the generated equalizer setting information to an equalizer of the audio reproduction device.

2. The method for setting an aircraft entertainment system according to claim 1, further comprising the step of storing in a storage medium the equalizer setting information with third information for identifying a device that reads the equalizer setting information.

3. The method for setting an aircraft entertainment system according to claim 2, wherein the third information includes information for identifying the model of the audio reproduction device.

4. The method for setting an aircraft entertainment system according to claim 2, wherein the third information includes information about seat class in which the audio reproduction device is installed.

5. The method for setting an aircraft entertainment system according to claim 1, wherein the second information includes information for identifying model of the audio reproduction device.

6. The method for setting an aircraft entertainment system according to claim 1, wherein the second information includes information about seat class.

7. The method for setting an aircraft entertainment system according to claim 1, wherein the second information includes information about airline company that operates an aircraft in which the audio reproduction device is installed.

8. An equalizer setting information generating system for an aircraft entertainment system, the equalizer setting information generating system comprising:

an earphone characteristic acquiring section for acquiring acoustic characteristics of an earphone;

an audio reproduction device identifying section for identifying acoustic characteristics of an audio reproduction device to be used with the earphone;

an equalizer information generating section for generating equalizer setting information from a combination of (i) the acoustic characteristics of the earphone acquired by the earphone characteristic acquiring section and (ii) the acoustic characteristics of the audio reproduction device identified by the audio reproduction device identifying section; and an equalizer setting section for applying the generated equalizer setting information to an equalizer of the audio reproduction device.

9. The equalizer setting information generating system for an aircraft entertainment system according to claim 8, further comprising a storage medium interface for storing the equalizer setting information in a storage medium, wherein the audio reproduction device identifying section generates application destination identifying information for identifying a device that reads the equalizer setting information, and the storage medium interface stores in the storage medium the application destination identifying information and the equalizer setting information in association with each other.

10. The equalizer setting information generating system for an aircraft entertainment system according to claim 9, wherein the application destination identifying information includes information for identifying model of the audio reproduction device.

11. The equalizer setting information generating system for an aircraft entertainment system according to claim 9, wherein the application destination identifying information includes information about seat class in which the audio reproduction device is installed.

12. The equalizer setting information generating system for an aircraft entertainment system according to claim 8, wherein the audio reproduction device identifying section identifies acoustic characteristics of the audio reproduction device that is used with the earphone, by using information for identifying the model of the audio reproduction device.

13. The equalizer setting information generating system for an aircraft entertainment system according to claim 8, wherein the audio reproduction device identifying section identifies acoustic characteristics of the audio reproduction device that is used with the earphone, by using information about seat class.

14. The equalizer setting information generating system for an aircraft entertainment system according to claim 8, wherein the audio reproduction device identifying section identifies acoustic characteristics of the audio reproduction device that is used with the earphone, by using information about airline company that operates an aircraft.

* * * * *